US012515933B2

(12) United States Patent
Russo et al.

(10) Patent No.: US 12,515,933 B2
(45) Date of Patent: Jan. 6, 2026

(54) METHOD AND APPARATUS FOR LIFTING GRATES

(71) Applicant: Ohio Gratings, Inc., Canton, OH (US)

(72) Inventors: Michael Darwin Russo, Minerva, OH (US); Kenneth P. Apperson, Oneonta, AL (US)

(73) Assignee: Ohio Gratings, Inc., Canton, OH (US)

( * ) Notice: Subject to any disclaimer, the term of this patent is extended or adjusted under 35 U.S.C. 154(b) by 450 days.

(21) Appl. No.: 18/049,045

(22) Filed: Oct. 24, 2022

(65) Prior Publication Data

US 2024/0132334 A1 Apr. 25, 2024
US 2024/0228250 A9 Jul. 11, 2024

(51) Int. Cl.
*B66F 11/00* (2006.01)

(52) U.S. Cl.
CPC ........... *B66F 11/00* (2013.01); *B66F 2700/09* (2013.01)

(58) Field of Classification Search
CPC .... B66F 19/005; B66F 11/00; B66F 2700/09; B66F 15/00
See application file for complete search history.

(56) References Cited

U.S. PATENT DOCUMENTS

| | | | | | |
|---|---|---|---|---|---|
| 1,102,937 | A | * | 7/1914 | Malaby | B25B 27/0007 72/454 |
| D538,179 | S | * | 3/2007 | Horton | D9/752 |
| D548,073 | S | * | 8/2007 | Peaslee | D9/434 |
| D709,760 | S | * | 7/2014 | Castell, Jr. | D9/434 |
| D748,473 | S | * | 2/2016 | Rendo | D9/434 |
| D765,981 | S | * | 9/2016 | Bare | D3/328 |
| D850,255 | S | * | 6/2019 | Petersson | D9/434 |
| D891,251 | S | * | 7/2020 | MacDonald | D9/455 |
| 2024/0132334 | A1 | * | 4/2024 | Russo | B66F 19/005 |
| 2024/0228250 | A9 | * | 7/2024 | Russo | B66F 11/00 |
| 2024/0270555 | A1 | * | 8/2024 | Watson | B66F 19/005 |

OTHER PUBLICATIONS

Ohio Gratings, Inc., "Old Lifter Design," pp. 1-2, Jun. 2020.
Ohio Gratings, Inc., "Wheels n' Heels, Ohio Grating Strong Close-Mesh Grating," pp. 1-2, Jun. 2020.

* cited by examiner

*Primary Examiner* — Lee D Wilson
(74) *Attorney, Agent, or Firm* — Sand, Sebolt & Wernow Co., LPA

(57) ABSTRACT

Grate lifters for moving grating assemblies relative to supporting structures within which the grating assemblies are installed. A grate lifter may include a main body having a first end and a second end longitudinally opposite to the first end. A grate lifter may also include at least one hook member operably engaged with the main body at the first end and configured to engage one of at least one surface bar of a grating assembly and at least one cross member of the grating assembly. A grate lifter may also include at least one tab operably engaged with the main body at the second end and configured to engage at least one lock bar of the grating assembly. The at least one tab may be configured to be adjustable from an initial position to a bent position to engage the at least one lock bar of the grating assembly.

12 Claims, 19 Drawing Sheets

METHOD AND APPARATUS FOR LIFTING GRATES

TECHNICAL FIELD

This disclosure is directed to devices for lifting grates or grating assemblies from supporting structures.

BACKGROUND

Grating assemblies configured for supporting vehicle and/or pedestrian traffic are commonly used on sidewalks and road surfaces requiring venting and/or drainage therethrough. Often, these grating systems are configured to permit various sizing of wheels and/or foot traffic to pass there over without catching or presenting a hazard thereto. Typically, as such grating assemblies are installed in areas where they are easily seen and not easily concealed, these grating assemblies are typically designed to be functional while also being aesthetically pleasing. However, these grating assemblies may utilize close-mesh grating panels and/or close grating surface bars to permit various sizing of wheels and/or foot traffic to pass there over without catching or presenting a hazard. As such, operations of moving these grating assemblies for maintenance and/or services purposes are rather difficult due to the close spacing of specific grating members, particularly grating surface bars.

To combat this issue, users and/or owners of these grating assemblies must utilize specific techniques while using various tools to grab and/or grip these grating assemblies. In one aspect, users and/or owners of these grating assemblies may have to utilize one or more separate tools to both grab and/or grip the grating assembly and to lift the grating assembly from a supporting structure. While this technique may be feasible, the users and/or owner must have various tools on hand with a sufficient labor assistance to move these grating assemblies in a timely and safe manner. In another aspect, users and/or owners of these grating assemblies may be able to provide leverage on the grating assemblies from various angles about the grating assemblies (i.e., pressing and/or pushing on the grating assemblies at a position below the grating assemblies). While this technique may be feasible, various users and/or owners of these grating assemblies may have limited access in moving these grating assemblies dictated by the implementation of these grating assemblies.

SUMMARY

The presently disclosed grate lifter is configured to operably engage with at least one grating assembly that includes a close-mesh grating and/or close spacing grating surface bars. In one aspect, a grate lifter described herein includes at least one hook member that operably engages with at least one cross member of a first grating assembly for lifting the first grating assembly. In another aspect, another grate lifter described herein includes at least one hook member that operably engages with at least one surface bar of a second grating assembly for lifting the second grating assembly. In yet another aspect, a grate lifter described herein may also include at least one adjustable tab that operably engages with at least one lock bar of a grating assembly described herein to maintain the grate lifter at a retracted position. The presently disclosed grate lifters address some inadequacies of moving a close-mesh grating and/or close spacing grating surface bars grating assembly from a supporting surface.

In one aspect, an exemplary embodiment of the present disclosure may provide a grate lifter. The grate lifter includes a main body having a first end and a second end longitudinally opposite to the first end. The grate lifter also includes at least one hook member operably engaged with the main body at the first end and configured to engage one of at least one surface bar of a grating assembly and at least one cross member of the grating assembly. The grate lifter also includes at least one tab operably engaged with the main body at the second end and configured to engage at least one lock bar of the grating assembly. The at least one tab is configured to be adjustable from an initial position to a bent position to engage the at least one lock bar of the grating assembly.

This exemplary embodiment or another exemplary embodiment may further include that the grate lifter is a single monolithic member that is substantially planar between the first end and second end. This exemplary embodiment or another exemplary embodiment may further include that when the grate lifter is provided in a lifted position, the at least one hook member engages with the at least one cross member of the grating assembly and the at least one tab disengages from the at least one lock bar of the grating assembly. This exemplary embodiment or another exemplary embodiment may further include that when the grate lifter is provided in a retracted position, the at least one tab member engages with the at least one lock bar and the at least one hook member disengages from the at least one cross member. This exemplary embodiment or another exemplary embodiment may further include that when the grate lifter is provided in a lifted position, the first end of the grate lifter is positioned outside of the grating assembly; and wherein when the grate lifter is provided in a retracted position, the first end of the grate lifter is positioned inside of the grating assembly. This exemplary embodiment or another exemplary embodiment may further include that the main body further comprises: a first surface extending between the first end and the second end; a second surface extending between the first end and the second end and vertically opposite to the first surface; and at least one attachment opening defined at a position between the first end and the second end and extending entirely through the main body between the first surface and the second surface; wherein the at least one opening is configured to enable a tool to operably engage with the grate lifter for transitioning the grate lifter between a lifted position and a retracted position to move the grating assembly. This exemplary embodiment or another exemplary embodiment may further include that the main body further comprises: a first side extending between the first end and the second end; and a second side extending between the first end and the second end and transversely opposite to the first side; and wherein the at least one hook member further comprises: a first hook member extending transversely away from the first side, wherein the first hook member is configured to engage with the at least one cross member of the grating assembly; and a second hook member extending transversely away from the second side and transversely opposite to the first hook member, wherein the second hook member is configured to engage at least another cross member of the grating assembly adjacent to the at least one cross member. This exemplary embodiment or another exemplary embodiment may further include a first hypothetical plane defined along the first surface and the second surface; and a second hypothetical plane defined along the first hook member; and a third hypothetical plane defined along the second hook member; wherein the first hypothetical plane, the second hypothetical plane, and third hypothetical plane are parallel with one another. This exemplary embodiment or another exemplary embodiment may further include that the at least one tab further comprises: a first tab extending longitudinally away from the first end, wherein the first tab is configured to engage a first lock bar when adjusted from the initial position to the bent position; and a second tab extending longitudinally away from the first end and transversely opposite to the first tab, wherein the second tab is configured to engage a second lock bar adjacent to the first lock bar when adjusted from the initial position to the bent position. This exemplary embodiment or another exemplary embodiment may further include that the main body further comprises: a first aperture defined in the main body; and a second aperture defined in the main body; and wherein the at least one hook member further comprises: a first hook member engaged with the main body inside of the first aperture, wherein the first hook member is configured to engage with the at least one surface bar of the grating assembly; and a second hook member engaged with the main body inside of the second aperture, wherein the second hook member is configured to engage at least another surface bar of the grating assembly adjacent to the at least one surface bar. This exemplary embodiment or another exemplary embodiment may further include a first hypothetical plane defined along main body; a second hypothetical plane defined along the first hook member; and a third hypothetical plane defined along the second hook member; wherein the first hypothetical plane is perpendicular with and intersects the second hypothetical plane and the third hypothetical plane. This exemplary embodiment or another exemplary embodiment may further include that the at least one tab further comprises: a first tab extending longitudinally away from the first end, wherein the first tab is configured to engage the at least one lock bar when adjusted from the initial position to the bent position; and a second tab extending longitudinally away from the first end and transversely opposite to the first tab, wherein the second tab is configured to engage at least another lock bar of the grating assembly adjacent to the at least one lock bar when adjusted from the initial position to the bent position.

In another aspect, an exemplary embodiment of the present disclosure may provide a method. The method comprises steps of inserting at least one grate lifter between at least one pair of surface bars of the grating assembly; installing the at least one grate lifter with the grating assembly; engaging a hoist with the at least one grate lifter; moving the at least one grate lifter, via the hoist, from a retracted position to a lifted position; engaging at least one hook member of the at least one grate lifter with one of a surface bar of the at least one pair of surface bars of the grating assembly and a cross member of at least one pair of cross members of the grating assembly when the at least one grate lifter is provided in the lifted position; disengaging at least one tab of the at least one grate lifter from a lock bar of at least one pair of lock bars of the grating assembly when the at least one grate lifter is provided in the lifted position; and lifting the grating assembly from a supporting structure.

This exemplary embodiment or another exemplary embodiment may further include steps of lowering the grating assembly into the supporting structure; disengaging the hoist from the at least one grate lifter; disengaging the at least one hook member of the at least one grate lifter from one of the surface bar of the at least one pair of surface bars of the grating assembly and the cross member of the at least one pair of cross members of the grating assembly when the at least one grate lifter is provided in the retracted position; and engaging the at least one tab of the at least one grate lifter with the lock bar of the at least one pair of lock bars of the grating assembly when the at least one grate lifter is provided in the retracted position. This exemplary embodiment or another exemplary embodiment may further include that the step of installing the at least one grate lifter with the grating assembly further comprises: engaging at least one locking tool with the at least one grate lifter; maintaining the at least one grate lifter, via the at least one locking tool, at the lifted position; engaging at least one installation tool with the at least one tab; and bending the at least one tab of the at least one grate lifter, via the at least one installation tool, from an initial position to a bent position. This exemplary embodiment or another exemplary embodiment may further include that the step of bending the at least one tab of the at least one grate lifter, via the at least one installation tool, from an initial position to a bent position further includes that the at least one tab is bent until the at least one tab is bent to about ninety degrees relative to the initial position or rests on the lock bar of the at least one pair of lock bars. This exemplary embodiment or another exemplary embodiment may further include that the step of installing the at least one grate lifter with the grating assembly further comprises: engaging at least one locking tool with the at least one grate lifter; maintaining the at least one grate lifter, via the at least one locking tool, at the lifted position; engaging a first installation tool with a first tab of the at least one grate lifter; engaging a second installation tool with a second tab of the at least one grate lifter; and bending the first tab and the second tab, via the first installation tool and the second installation tool, from initial positions to bent positions. This exemplary embodiment or another exemplary embodiment may further include that the step of engaging the at least one hook member of the at least one grate lifter with the grating assembly further comprises: engaging a first hook member with a first cross member of the at least one pair of cross members; and engaging a second hook member with a second cross member of the at least one pair of cross members adjacent to the first cross member. This exemplary embodiment or another exemplary embodiment may further include that the step of engaging the at least one tab of the at least one grate lifter with the grating assembly further comprises: engaging a first tab with the lock bar of the at least one pair of lock bars; engaging a second tab with a second lock bar of the at least one pair of lock bars adjacent to the lock bar. This exemplary embodiment or another exemplary embodiment may further include that the step of engaging the at least one hook member of the at least one grate lifter with the grating assembly further comprises: engaging a first hook member with a first surface bar of the at least one pair of surface bars; and engaging a second hook member with a second surface bar of the at least one pair of surface bars adjacent to the first surface bar.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
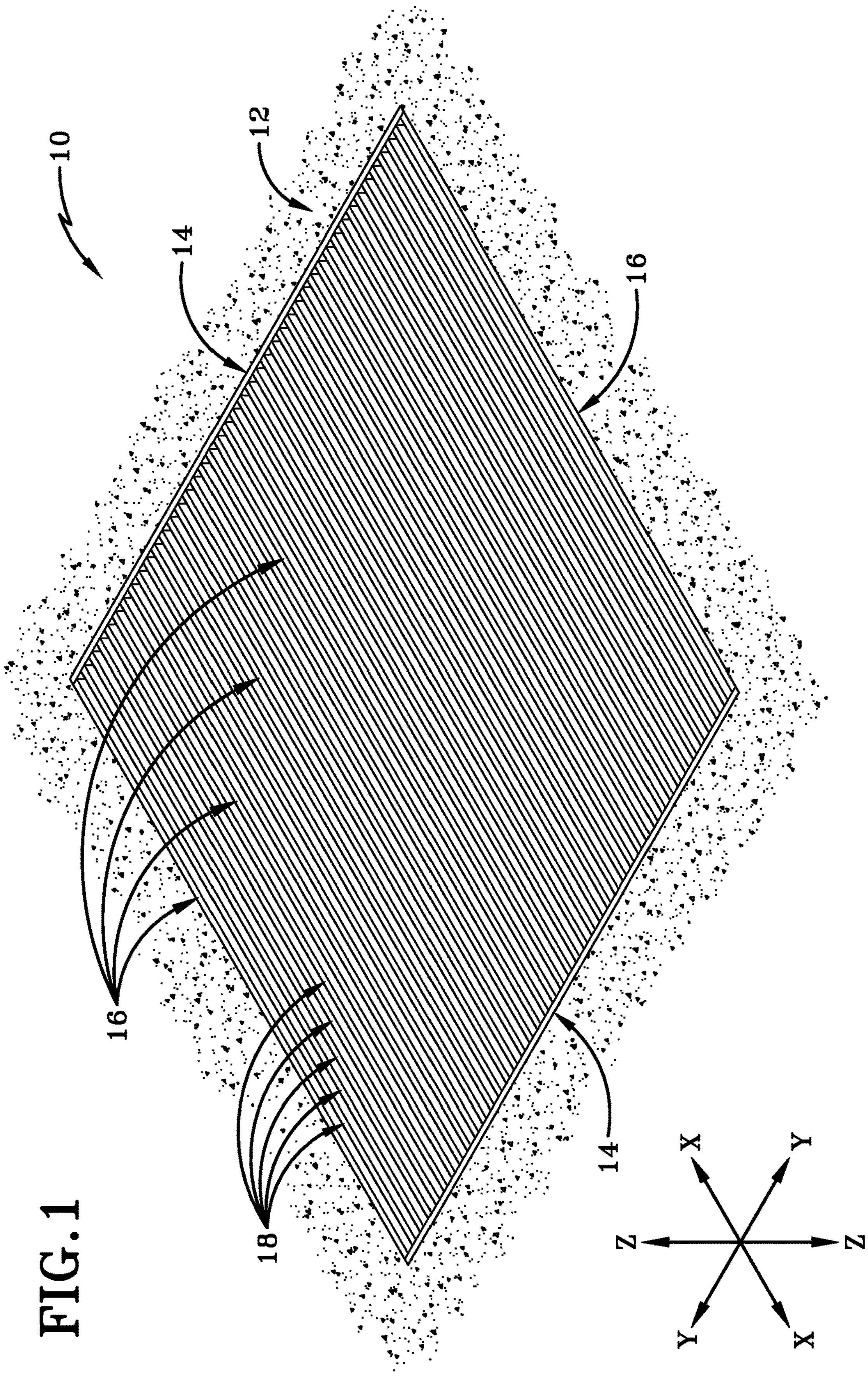
FIG. 1 is a top isometric view of a grating assembly suitable for engaging with a grate lifter according to one aspect of the present disclosure.

With reference to FIG. 1, a grating assembly of the present disclosure is shown and generally indicated as 10 (which may also be referenced to herein as grating assembly 10). Grating assembly 10 may be operably engaged with a supporting structure 12 and may generally include a first or top end 10A and a second or bottom end 10B vertically opposite to the top end 10A. Grating assembly 10 may also include a pair of side plates 14 that fixedly engages with at least one elongated surface plate 16 and at least one surface bar 18. Grating assembly 10 may also include at least at least one cross member 20 operably engaged with the at least one surface plate 16 and the at least one surface bar 18. Grating assembly 10 may also include at least one lock rod or lock bar 22 operably engaged with the at least one surface plate 16 and the at least one surface bar 18.

Referring to the at least one surface plate 16, grating assembly 10 may include any suitable number of surface plates based on a desired implementation of the grating assembly 10. In one aspect, grating assembly 10 may include a plurality of surface plates 16 that fixedly connects with the pair of side plates 14, at least one pair of cross members 20, and at least one pair of lock bars 22. As illustrated in FIG. 1, each surface plate of the plurality of surface plate 18 is oriented perpendicular with the pair of side plates 14 of the grating assembly 10.

Referring to the at least one surface bar 18, grating assembly 10 may include any suitable number of surface bars based on a desired implementation of the grating assembly 10. In one aspect, grating assembly 10 may include a plurality of surface bars 18 that fixedly connects with the pair of side plates 14, at least one pair of cross members 20, and at least one pair of lock bars 22.

Figure 3:
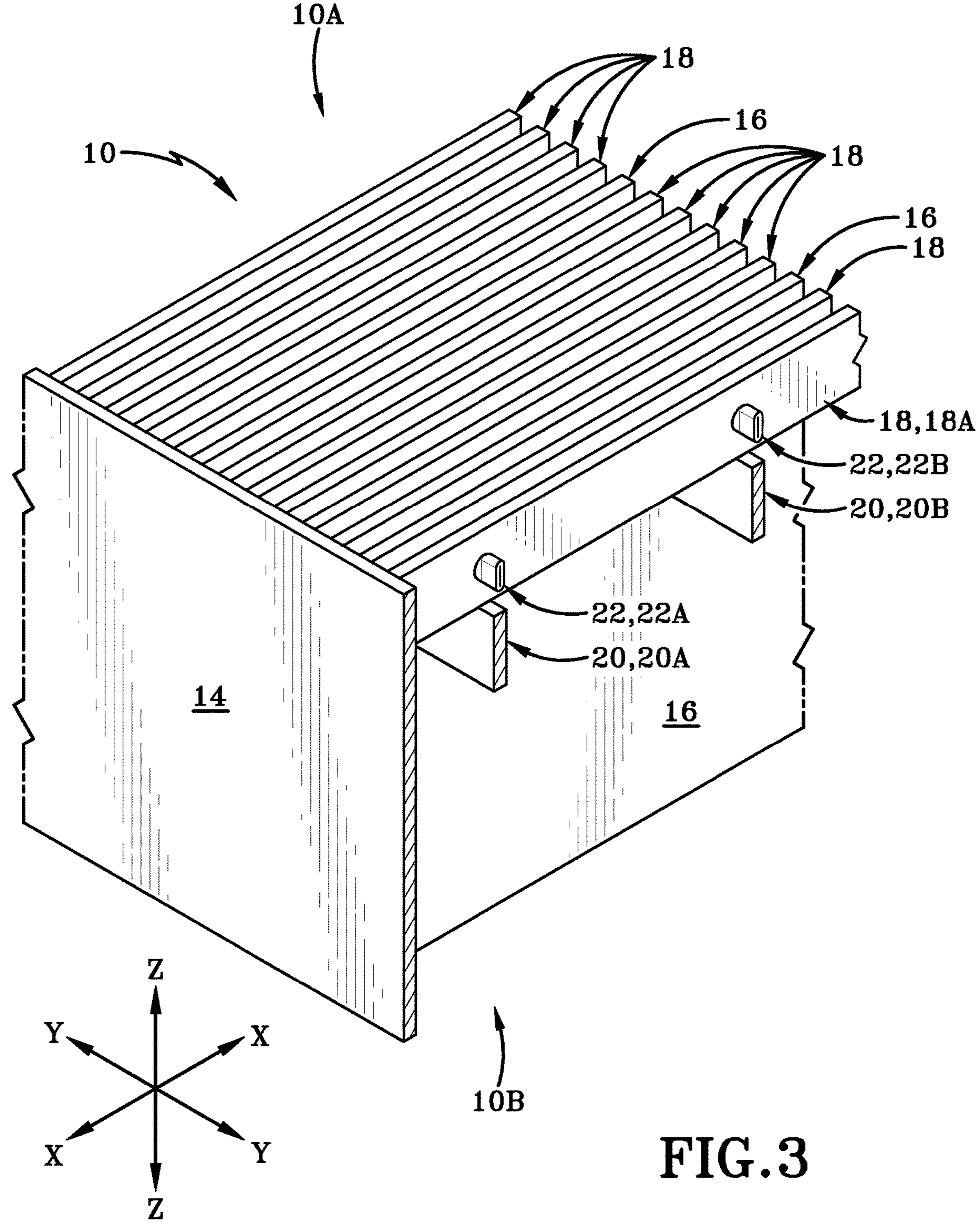
FIG. 3 is a partial sectional view of a portion of the grating assembly shown in FIG. 1.

Referring to the at least one cross member 20, grating assembly 10 may include any suitable number of cross members and may be fixedly connected with at least one surface bar based on a desired implementation of the grating assembly 10. In one aspect, the at least one pair of cross members 20 may be positioned vertically below at least one surface bar of the plurality of surface bars 18 as the at least one pair of cross members 20 is fixedly connected with the plurality of surface bars 18 (see FIGS. 3 and 4). In this same aspect, the at least one pair of cross members 20 is oriented perpendicular to the plurality of the surface bars 18. In another aspect, the at least one pair of cross members 20 may also pass through at least another surface bar of the plurality of surface bars 18 as the at least one pair of cross members 20 is fixedly connected with the plurality of surface bars 18 (see FIG. 5). In this same aspect, the at least one pair of cross members 20 is also oriented perpendicular to the plurality of the surface bars 18. In yet another aspect, grating assembly 10 may omit and/or remove the at least one cross member 20 from engaging any surface bar 18 provided in grating assembly 10 (see FIGS. 12 and 13).

Referring to the at least one lock bar 22, grating assembly 10 may include any suitable number of lock bars and may be fixedly connected with at least one surface bar based on a desired implementation of the grating assembly 10. In one aspect, each lock bar of at least one pair of lock bar 22 may pass through the plurality of surface bars 18 as the at least one pair of lock bars 22 is fixedly connected with the plurality of surface bars 18 (see FIGS. 3-5). In this same aspect, the at least one pair of lock bars 22 is oriented perpendicular to the plurality of the surface bars 18 and oriented parallel with the at least one pair of cross members 20. Similarly, in another aspect, each lock bar of at least one pair of lock bar 22 may pass through a plurality of surface as the at least one pair of lock bars 22 is fixedly connected with the plurality of surface bars 18 (see FIGS. 12-13). In this aspect, the at least one pair of lock bars 22 is oriented perpendicular to the plurality of the surface bars 18.

Figure 12:
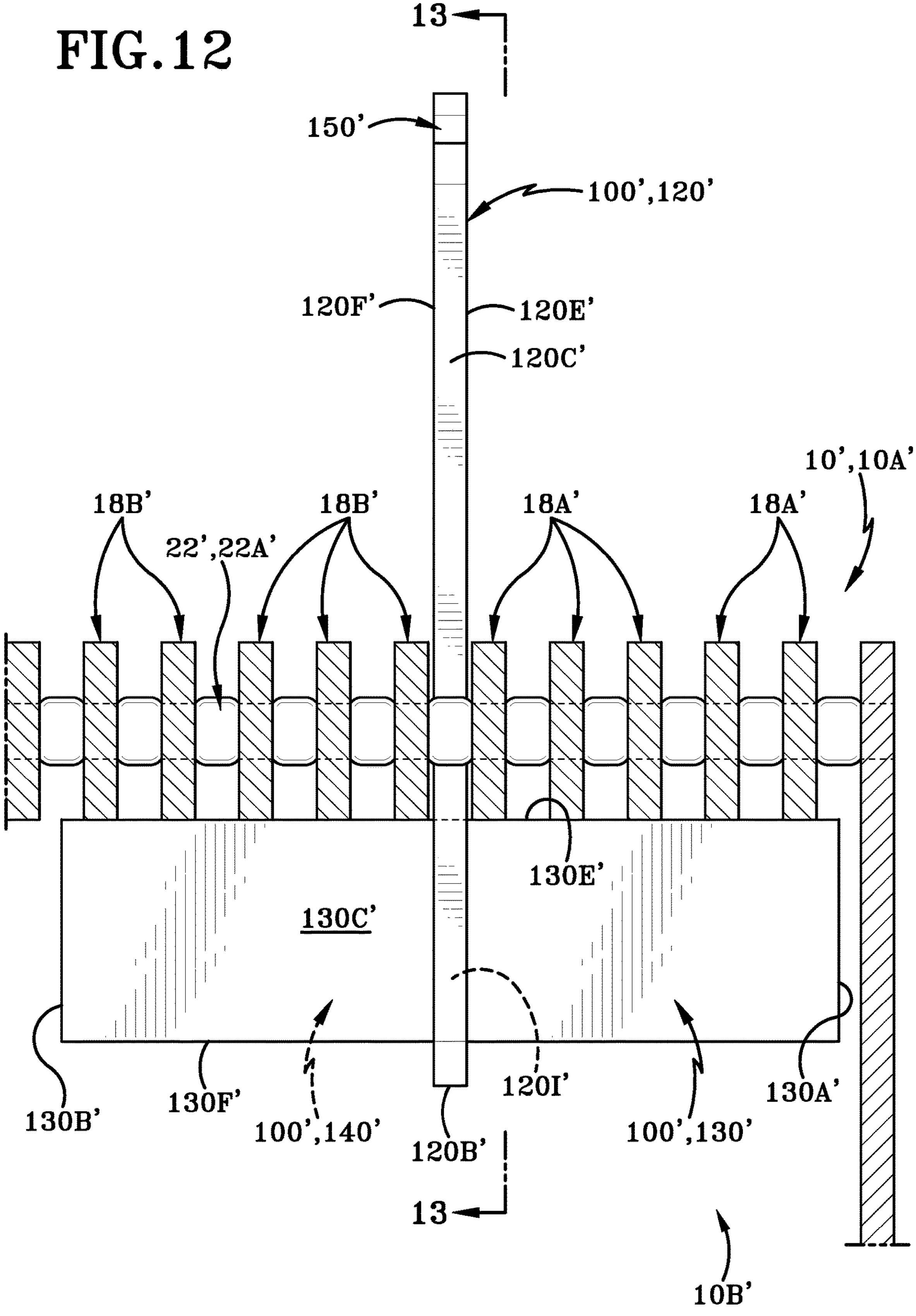
FIG. 12 is a sectional view of another grating assembly according to another aspect of the present disclosure and the grate lifter shown in FIG. 11, wherein the grate lifter is provided in a lifted position.
Figure 13:
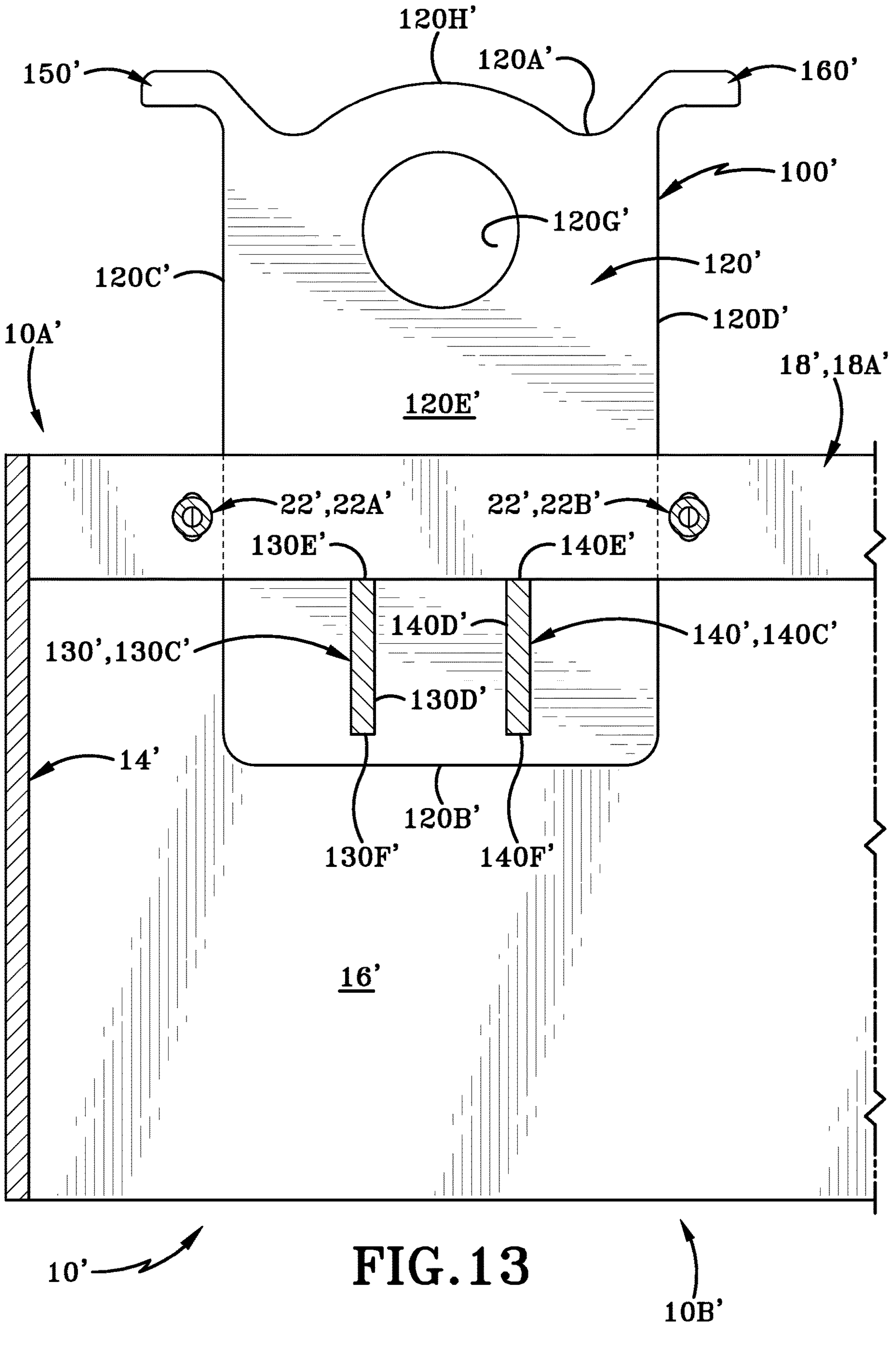
FIG. 13 is a sectional view of the grating assembly and the grate lifter taken in the direction of line 13-13 shown in FIG. 12.

It should be understood that the grating assembly 10 may be any commercially available grating assembly that is contemplated to be used with a substantially planar support structure, such as supporting structure 12. In one aspect, grating assembly described and illustrated herein may be Wheels n' Heels® Metro® grating manufactured and sold by Ohio Grating, Inc., which is illustrated in FIGS. 3-7 and 9A-10B. In another aspect, grating assembly described and illustrated herein may be Wheels n' Heels® InVent® grating manufactured and sold by Ohio Grating, Inc., which is illustrated in FIGS. 12-13. As described in more detail below, any suitable close-mesh grating assembly may be used utilized with a grate lifter described herein to operably engage with the selected grating assembly and to lift the selected grating assembly from the supporting structure 12.

Supporting structure 12, as shown and discussed herein, is contemplated as a substantially planar structure such as a concrete sidewalk, roadway, or other similar substantially planar structures of the like. It should be understood that supporting structure 12 may include any suitable structure and/or support system, such as metal beams and other structure of the like, that may be found in bridges, elevated walkways, platforms or similar applications. Further, it should also be understood that grating assembly 10 may be sized and configured for installation in supporting structures of varying materials and/or having varying profiles as dictated by the desired implementation. Accordingly, as described herein, use in relation to a sidewalk and/or roadway will be understood as an exemplary use and installation of grating assembly 10 and not a limiting example thereof. Supporting structure 12 is contemplated to have a surface, for example, a walking surface of a sidewalk or a road surface, that is substantially planar and coincides with a plane defined by the top of grating assembly 10, as discussed herein, to maintain a generally even and flat transition between supporting structure 12 and grating assembly 10. This may facilitate installation without having portions of grating assembly 10 extending above or below the surface of supporting structure 12 to eliminate potential hazards or dangers to users, user vehicles, and/or to grating assembly 10 and supporting structure 12.

Figure 2:
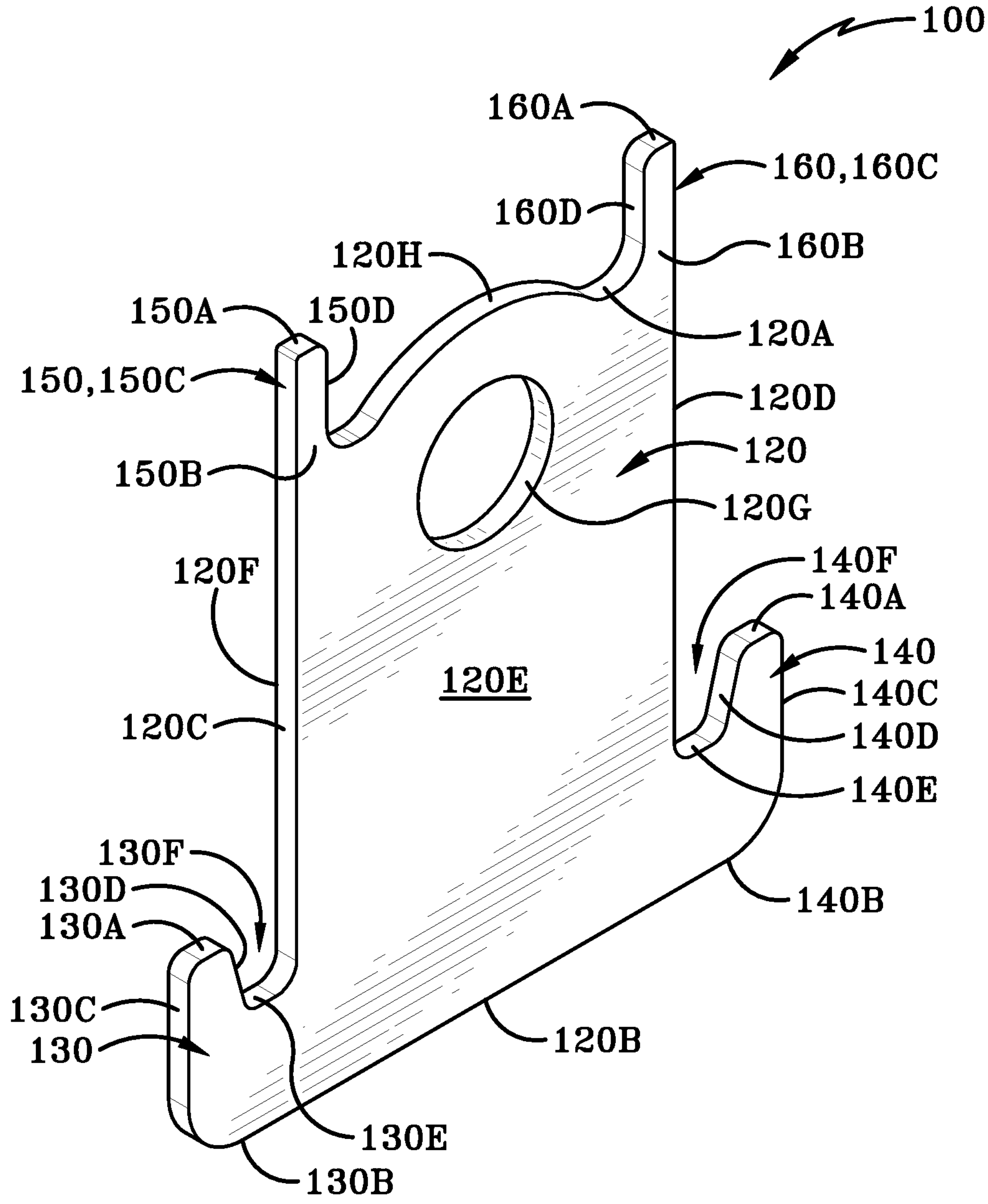
FIG. 2 is a front, top, first side isometric perspective view of the grate lifter according to one aspect of the present disclosure.

As best seen in FIG. 2, a grate lifter according to one aspect of the present disclosure is illustrated and generally indicated as 100. As described in more detail below, grate lifter 100 is configured to be installed with grating assembly 10 described and illustrated herein, particularly with the grating assembly 10 illustrated in FIGS. 3-7 and 9A-10B, for moving the grating assembly 10 either from the supporting structure 12 (see FIGS. 10A-10B) or into the supporting structure 12. Upon installation, grate lifter 100 is freely moveable relative to the grating assembly 10 between a lifted position (see FIGS. 7 and 10A-10B) and a retracted position (see FIG. 9E). It should be understood that grate lifter 100 is single, monolithic member that is installed with grating assembly 10 as compared to conventional and/or commercially available devices for moving grating assemblies. The components and features of the grate lifter 100 are described in greater detail below.

Grate lifter 100 may include a main body 120. As best seen in FIG. 2, the main body 120 may have a first end 120A, a second end 120B longitudinally opposite to the first end 120A, and a longitudinal axis defined therebetween. The main body 120 may also have a first side 120C extending between the first end 120A and the second end 120B, a second side 120D extending between the first end 120A and the second end 120B and transversely opposite to the first side 120C, and a transverse axis defined therebetween. The main body 120 may also include a first surface 120E that is positioned ahead of the first end 120A, the second end 120B, the first side 120C, and the second side 120D, and a second surface 120F that is positioned behind of the first end 120A, the second end 120B, the first side 120C, and the second side 120D and opposite to the first surface 120E.

Figure 10A:
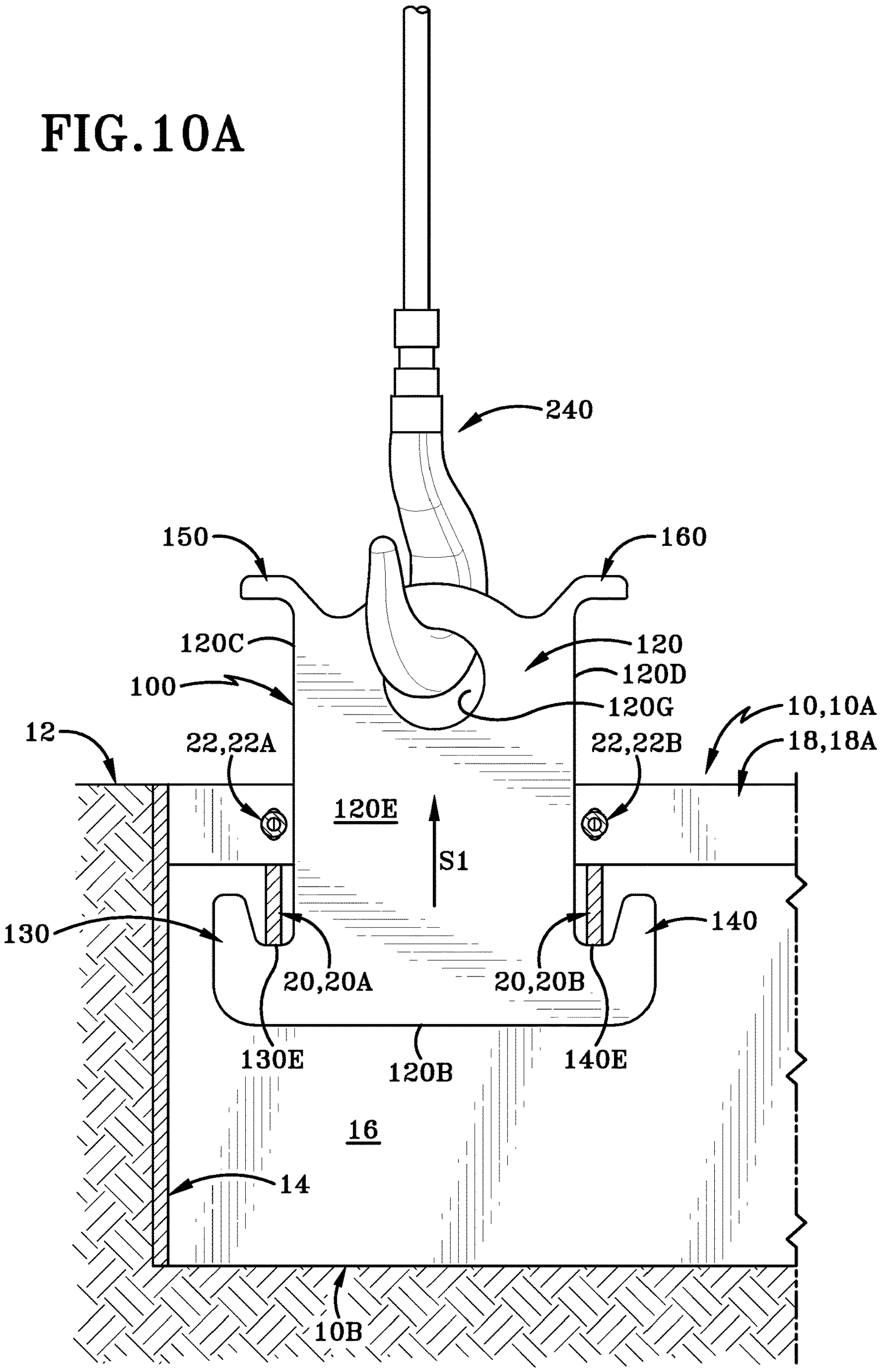
FIG. 10A is an operational view of a hoist operably engaged with the grate lifter, wherein the hoist lifts the grate lifter from the retracted position to the lifted position.
Figure 10B:
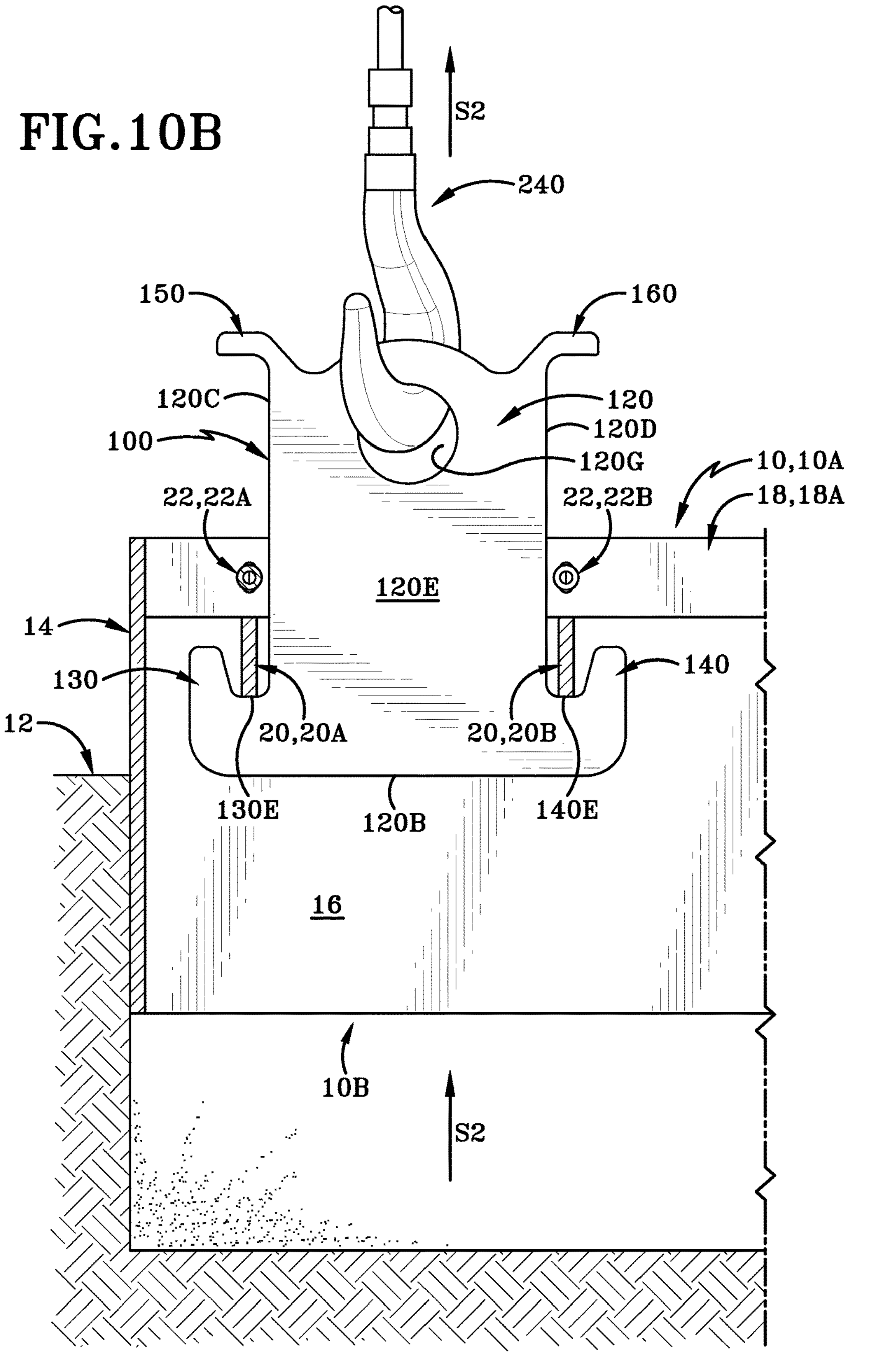
FIG. 10B is an operational view similar to FIG. 10A, but the grate lifter lifts a portion of the grating assembly from the supporting structure as the hoist lifts the grate lifter.

Still referring to FIG. 2, the main body 120 may define at least one attachment opening 120G. As illustrated, the at least one attachment opening 120G is defined proximate to and/or closer to the first end 120A of the main body 120. The at least one attachment opening 120G also extends entirely through the main body 120 from the first surface 120E to the second surface 120F in which the first surface 120E and the second surface 120F are in fluid communication with one another via the at least one attachment opening 120G. As described in more detail below, the at least one attachment opening 120G is configured to enable a hoist (crane or similar tool of the like) to operably engage with the grate lifter 100 for moving the grating assembly 10 relative to the supporting structure 12 via the grate lifter 100 (as best seen in FIGS. 10A and 10B). In one aspect, the main body 120 defines a single attachment opening 120G that is positioned proximate to and/or closer to the first end 120A of the main body 120 and extends entirely through the main body 120 from the first surface 120E to the second surface 120F in which the first surface 120E and the second surface 120F are in fluid communication with one another via the at least one attachment opening 120G. In other exemplary embodiments, any suitable number of attachment openings may be defined in a main body of a grate lifter described and illustrated herein for moving a grating assembly relative to a supporting structure via the grate lifter.

Still referring to FIG. 2, the main body 120 may also define a protrusion 120H that extends radially upwardly from the first end 120A. In one aspect, the protrusion 120H may define a curvilinear shape that matches and/or complementary with the curvilinear shape of the at least one attachment opening 120G defined in the main body 120. In other exemplary embodiments, the main body 120 may omit and/or remove the protrusion 120H such that the first end 120A is free from additional structures and/or features extending from the first end 120A.

Grate lifter 100 also includes at least one hook member that operably engages with the main body 120 at one or both of the first side 120C and the second side 120D of the main body 120. In one example, the grate lifter 100 includes a first hook member 130 that operably engages with the main body 120 at the first side 120C of the main body 120. In the same example, the grate lifter 100 also includes a second hook member 140 that operably engages with the main body 120 at the second side 120D of the main body 120. As described in more detail below, the first hook member 130 and the second hook member 140 are configured to engage a pair of cross members 20 of the grating assembly 10 when the grate lifter 100 is provided in the lifted position. Inasmuch as the grate lifter 100 includes a first hook member 130 and a second hook member 140, the following description will relate to the first hook member 130. It should be understood, however, that the description of the first hook member 130 applies substantially equally to the second hook member 140 where the second hook member 140 is oriented in a mirrored-image of the first hook member 130 relative to the main body 120.

Referring to FIG. 2, first hook member 130 includes a first end 130A and a second end 130B longitudinally opposite to the first end 130A and continuous with the second end 120B of the main body 120. First hook member 130 also includes a first side 130C extending between the first end 130A and the second end 130B, a second side 130D transversely opposite to the first side 130C and extending downwardly from the first end 130A to a third end 130E of the first hook member 130; the second side 130D and third end 130E are continuous with one another. As illustrated, the third end 130E is oriented substantially parallel with the first end 130A and positioned below the first end 130A of the first hook member 130. The third end 130E is also operably engaged with the first side 120C of the main body 120 in which the first side 120C of the main body 120 and the third end 130E of the first hook member 130 are continuous with one another.

As best seen in FIG. 2, a notch 130F is collectively defined by the first hook member 130 and the main body 120. More particularly, the notch 130F is collectively defined by a portion of the first side 120C of the main body 120 along with the second side 130D and the third end 130E of the first hook member 130. As described in more detail below, the notch 130F is configured to receive a portion of a cross member from the at least one pair of cross members 20 of the grating assembly 10 when the grate lifter 100 is provided in the lifted position. As such, the notch 130F enables the first hook member 130 to engage with the portion of the cross member from the at least one pair of cross members 20 to move a portion of the grating assembly 10 relative to the supporting structure 12.

As described above, each of the first hook member 130 and the second hook member 140 operably engages with a cross member of the at least one pair of cross members 20 in a substantially similar implementation. Additionally, the second hook member 140 is a mirrored-image of the first hook member 130 relative to the longitudinal axis of the main body 120. As such, a first end 140A, a second end 140B, a first side 140C, a second side 140D, and a third end 140E are substantially similar to the first end 130A, second end 130B, first side 130C, second side 130D, and third end 130E of the first hook member 130.

Moreover, a notch 140F is collectively defined by the main body 120 and the second hook member 140 similar to the notch 130F collectively defined by the main body 120 and the first hook member 130. More particularly, the notch 140F is collectively defined by a portion of the second side 120D of the main body 120 along with the second side 140D and the third end 140E of the second hook member 140. As described in more detail below, the notch 140F is configured to receive a portion of another cross member from the at least one pair of cross members 20 of the grating assembly 10 when the grate lifter 100 is provided in the lifted position. As such, the notch 140F enables the second hook member 140 to engage with the portion of the another cross member from the at least one pair of cross members 20 to move a portion of the grating assembly 10 relative to the supporting structure 12.

It should be understood that the first hook member 130 and the second hook member 140 may be operably engaged with the main body 120 in any suitable configuration as dictated by the implementation of the grate lifer 100. In one aspect, the first hook member 130 and the second hook member 140 are formed with the main body 120 in that the main body 120, the first hook member 130, and the second hook member 140 collectively define a single monolithic member. In another aspect, one or both of the first hook member 130 and the second hook member 140 are engaged with the main body 120 in that the main body 120, the first hook member 130, and/or the second hook member 140 are separate components forming the grate lifter 100.

It should also be understood that the first hook member 130 and the second hook member 140 may be orientated at any suitable angle and/or orientation relative to the main body 120. In one aspect, the main body 120 is positioned on a first hypothetical plane, and each of the first hook member 130 and the second hook member 140 is positioned on a second hypothetical plane that is parallel with the first hypothetical plane and free from intersecting the first hypothetical plane.

Grate lifter 100 also includes at least one tab that operably engages with the main body 120 at the first end 120A and positioned proximate to one or both of the first side 120C and the second side 120D of the main body 120. In one example, the grate lifter 100 includes a first tab 150 that operably engages with the main body 120 at the first end 120A and positioned proximate to the first side 120C of the main body 120. In the same example, the grate lifter 100 also includes a second tab 160 that operably engages with the main body 120 at the first end 120A of the main body 120 and positioned proximate to the second side 120D of the main body 120 transversely opposite to the first tab 150. As described in more detail below, the first tab 150 and the second tab 160 are configured to engage a pair of lock bar 22 of the grating assembly 10 when the first tab 150 and the second tab 160 are bent from initial positions (FIGS. 2, 4-7, and 9A-9B) to bent positions (FIG. 9E) and the grate lifter 100 is provided in the retracted position. Inasmuch as the grate lifter 100 includes a first tab 150 and the second tab 160, the following description will relate to the first tab 150. It should be understood, however, that the description of the first tab 150 applies substantially equally to the second tab 160 where the second tab 160 is oriented in a mirrored-image of the first tab 150 relative to the main body 120.

Referring to FIG. 2, first tab 150 includes a first end 150A and a second end 150B longitudinally opposite to the first end 150A and continuous with the first end 120A of the main body 120. First tab 150 also includes a first side 150C extending between the first end 150A and the second end 150B, and a second side 150D transversely opposite to the first side 150C and extending downwardly from the first end 150A to the first end 120A of the main body 120. As illustrated, the first side 150C is also operably engaged with the first side 120C of the main body 120 in which the first side 120C of the main body 120 and the first side 150C of the first tab 150 are continuous with one another. As described in more detail below, the first tab 150 is adjustable and/or is configured to be bent at the second end 1508 via an installation tool according to an aspect of the present disclosure.

As described above, the first tab 150 and the second tab 160 are configured to engage a pair of lock bar 22 of the grating assembly 10 when the first tab 150 and the second tab 160 are bent from initial positions (FIGS. 2, 4-7, and 9A-9B) to bent positions (FIG. 9E) and the grate lifter 100 is provided in the retracted position. Additionally, the second tab 160 is oriented in a mirrored-image of the first tab 150 in which the second tab 160 is vertically rotated about the longitudinal axis of the main body 120. As such, a first end 160A, a second end 1608, a first side 160C, and a second side 160D are substantially similar to the first end 150A, second end 150B, first side 150C, and second side 150D of the first tab 150. As illustrated, the first side 160C is also operably engaged with the second side 120D of the main body 120 in which the second side 120D of the main body 120 and the first side 150C of the first tab 150 are continuous with one another. Similar to the first tab 150, the second tab 160 is adjustable and/or is configured to be bent at the second end 1608 via an installation tool according to an aspect of the present disclosure, which is described in more detail below.

Figure 8:
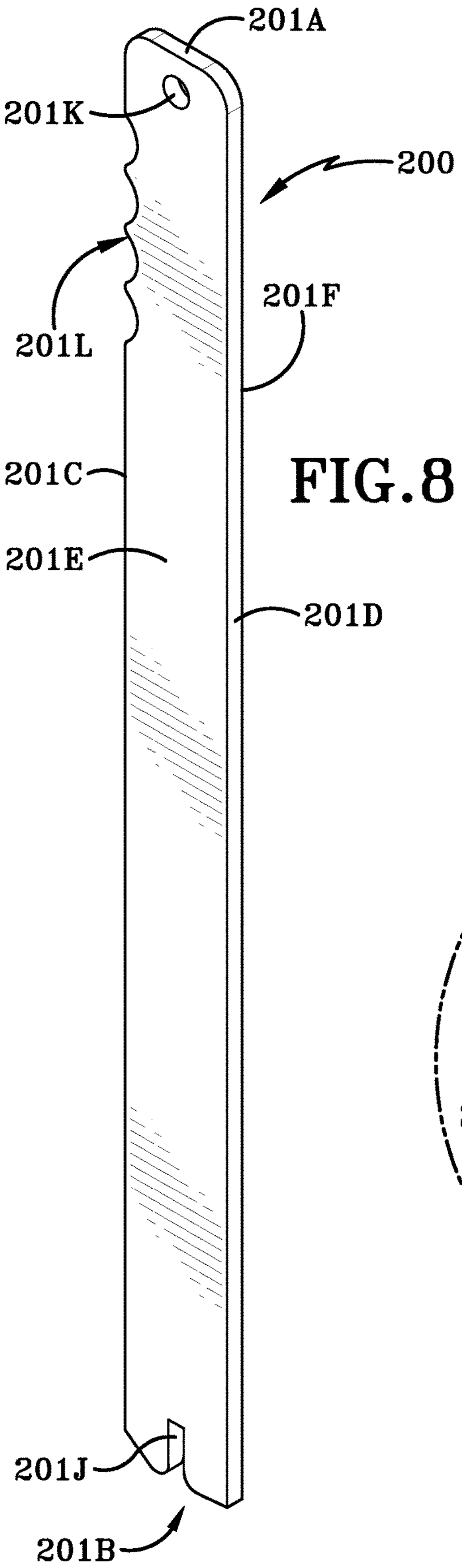
FIG. 8 is a top isometric perspective view of an installation tool according to one aspect of the present disclosure.
Figure 8A:
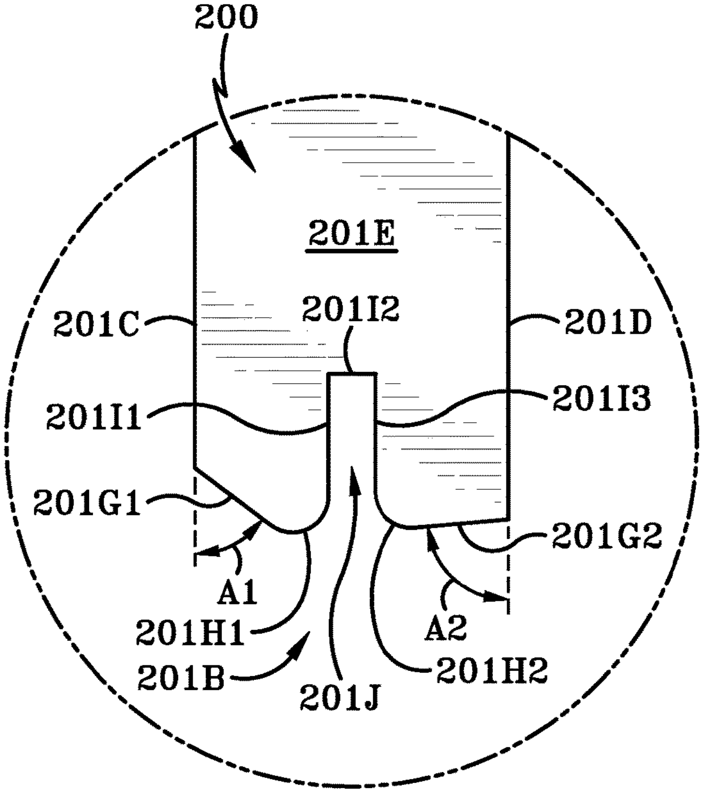
FIG. 8A is an enlargement of the highlighted region shown in FIG. 8.

Referring to FIGS. 8 and 8A, an installation tool 200 is illustrated according to an aspect of the present disclosure. As described in more detail below, the installation tool 200 is configured to bend one or both of the first tab 150 and the second tab 160 from initial positions (see FIG. 2) to bent positions (see FIG. 9C) for engaging one or both of the first tab 150 and the second tab 160 to the grating assembly 10. More particularly, the installation tool 200 is configured to bend one or both of the first tab 150 and the second tab 160 from initial positions (see FIG. 2) to bent positions (see FIG. 9C) for engaging one or both of the first tab 150 and the second tab 160 to at least one cross member 20 of the grating assembly 10. Such features and characteristics of the installation tool 200 is described in more detail below.

As best seen in FIG. 8, the installation tool 200 includes a first end 201A, a second end 201B longitudinally opposite to the first end 201A, and a longitudinal axis defined therebetween. The installation tool 200 also includes a first side 2010 that extends between the first end 201A and the second end 201B, a second side 201D that extends between the first end 201A and the second end 201B and is transversely opposite to the first side 201C, and a transverse axis defined therebetween. The installation tool 200 also includes a first surface 201E that is vertically above the first end 201A, the second end 201B, the first side 201C, and the second side 201D, a second surface 201F that is vertically below the first end 201A, the second end 201B, the first side 201C, and the second side 201D and vertically opposite to the first surface 201E, and a vertical axis defined therebetween.

As best seen in FIG. 8A, the second end 201B includes a first angled wall 201G1 that extends from the first side 2010 to a first curvilinear wall 201H1. It should be understood that each of the first angled wall 201G1 and the first curvilinear wall 201H1 forms the second end 201B. In the illustrated embodiment, the first angled wall 201G1 is defined at a first angle A1 measured relative to the first side 201C. The second end 201B also includes a second angled wall 201G2 that extends from the second side 201D to a second curvilinear wall 201H2. It should also be understood that each of the second angled wall 201G2 and the second curvilinear wall 201H2 is forms the second end 201B and is transversely opposite to the first angled wall 201G1 and the first curvilinear wall 201H1. In the illustrated embodiment, the second angled wall 201G2 is defined at a second angle A2 measured relative to the second side 201D. In one aspect, the first angle A1 of the first angled wall 201G1 is different than the second angle A2 of the second angle wall 201G2 where the second angle A2 is greater than the first angle A1. Such uses and purposes of the first angled wall 201G1, the second angled wall 201G2, the first curvilinear wall 201H1, and the second curvilinear wall 201H2 are described in greater detail below.

The installation tool 200 also includes at least one interior wall 201I that is positioned between the first side 201C and the second side 201D. As best seen in FIG. 8A, the installation tool 200 includes a first interior wall 201I1 that extends upwardly from the first curvilinear wall 201H1 to a second interior wall 201I2 oriented perpendicular to the first interior wall 201I1. The installation tool 200 also includes a third interior wall 201I3 that extends upwardly from the second curvilinear wall 201H2 to the second interior wall 201I2 where the second interior wall 201I2 is also oriented perpendicular to the third interior wall 201I3. As best seen in FIG. 8A, the installation tool 200 also defines a slot 201J that extends upwardly from the second end 201B towards the first end 201A. More particularly, the first interior wall 201I1, the second interior wall 201I2, and the third interior wall 201I3 collectively define the slot 201J that that extends upwardly from the second end 201B to the second interior wall 201I2.

The installation tool 200 also defines at least one through-hole 201K. As best seen in FIG. 8, the at least one through-hole 201K extends entirely through the installation tool 200 between the first surface 201E and the second surface 201F such that the first surface 201E and the second surface 201F are in fluid communication with one another. In one aspect, the at least one through-hole 201K is defined proximate to the first end 201A of the installation tool 200. In another aspect, the at least one through-hole 201K is defined at any suitable position on the installation tool 200. The at least one through-hole 201K may be configured to enable a user of the installation tool 200 to hang or set the installation tool 200 on a retaining member (e.g., a hook or peg mounted on a support surface) when the installation tool 200 is not being used.

The installation tool 200 also defines a handle 201L proximate to the first end 201A of the installation tool 200. As best seen in FIG. 8, the handle 201L extends transversely from the first side 201C towards the second side 201D. The handle 201L includes a set of curvilinear depressions or scallops that enables a user of the installation tool 200 to grip and hold the installation tool 200 with four digits when using the installation tool 200.

Having now described the grate lifter 100 along with the installation tool 200, a method of installing a grate lifter 100 with the grating assembly 10 is described in more detail below.

Figure 4:
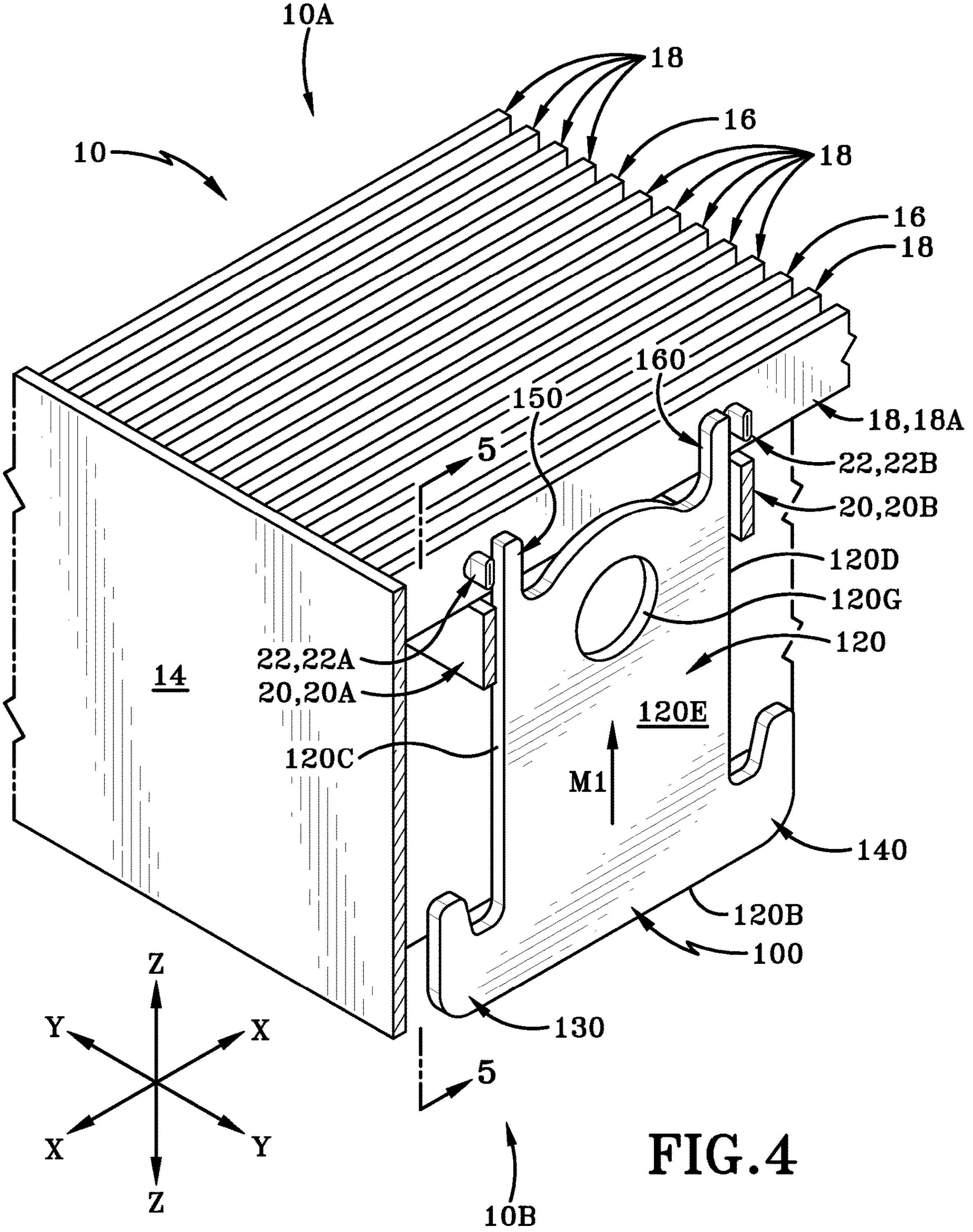
FIG. 4 is operational view of the grate lifter shown in FIG. 2 being introduced into the portion of the grating assembly.
Figure 5:
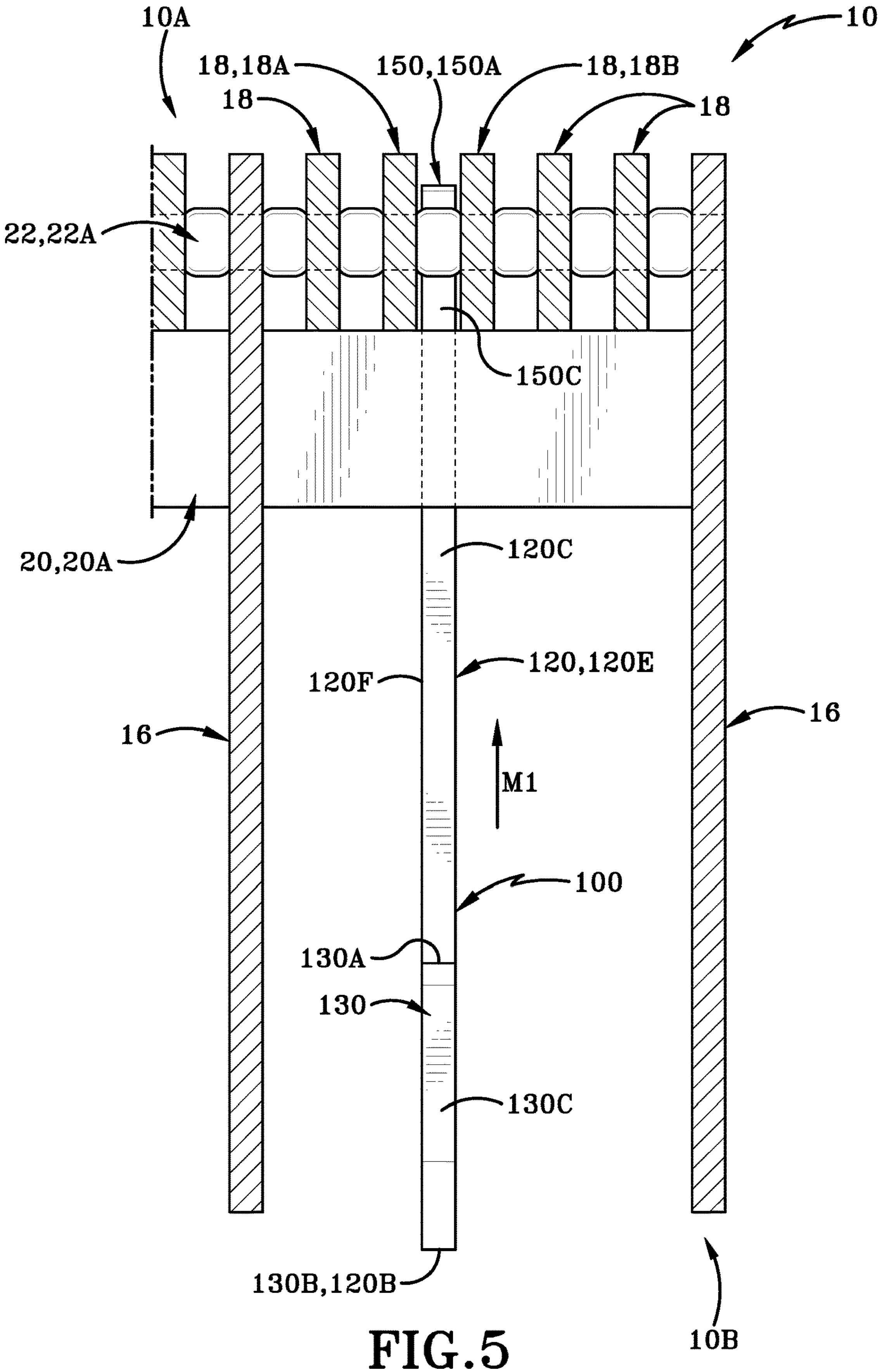
FIG. 5 is a sectional view of the grating assembly and the grate lifter taken in the direction of line 5-5 shown in FIG. 4.

Initially, a user may introduce the grate lifter 100 into a portion of the grating assembly 10 from the bottom end 10B of the grating assembly 10. As best seen in FIG. 4, the user introduces the grate lifter 100 through the bottom end 10B of the grating assembly 10 while ensuring the grate lifter 100 is centered and/or positioned between a first surface bar 18A and a second surface bar 18B of a pair of surface bars 18 (see FIG. 5). Once centered, the user may then insert the grate lifter 100 between the pair of surface bars 18 and between a pair of cross members 20 and a pair of lock bars 22 (see FIG. 4); such insertion and movement of the grate lifter 100 is denoted by an arrow labeled "M1" shown in FIGS. 4 and 5.

Figure 6:
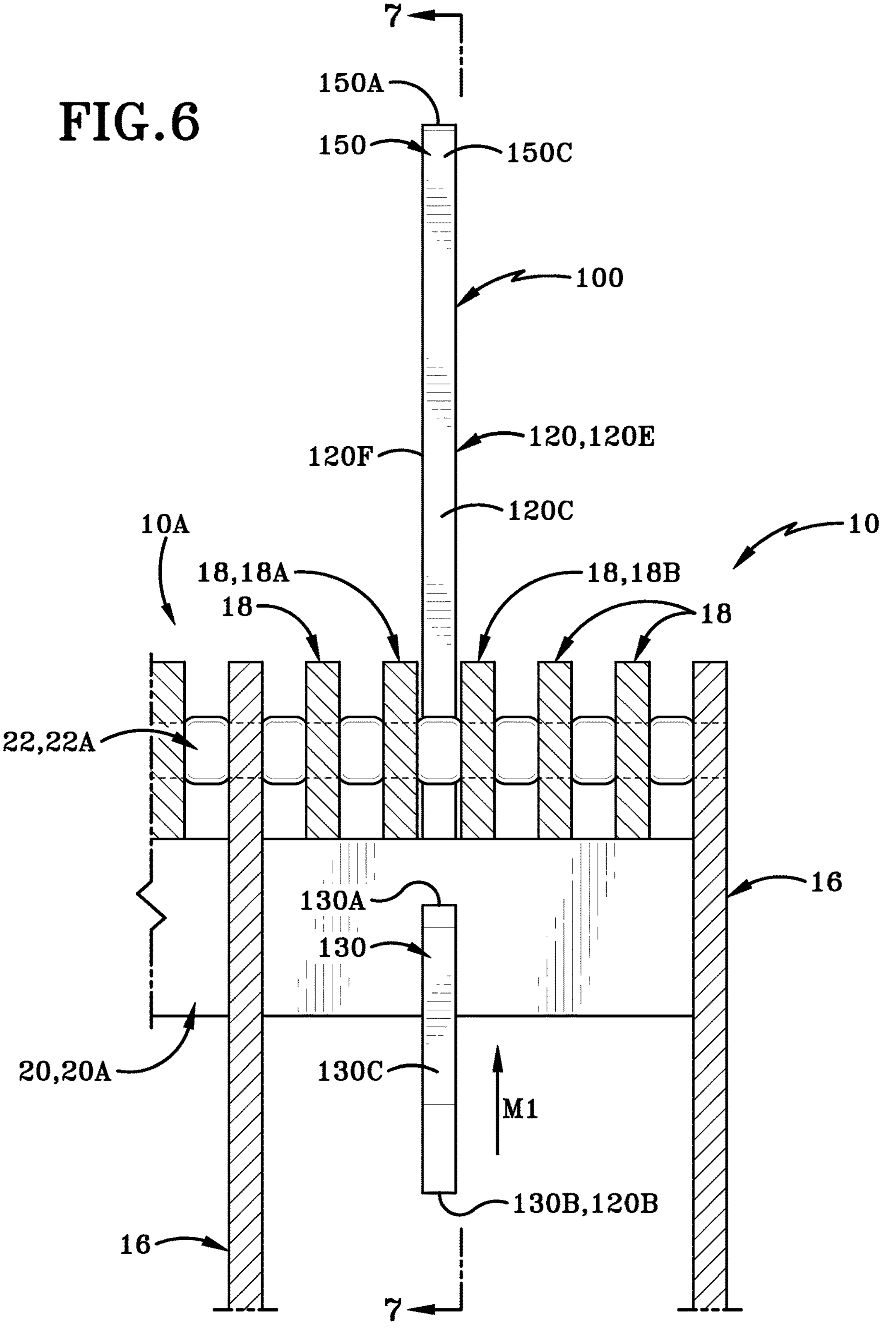
FIG. 6 is another operational view similar to FIG. 4, but the grate lifter is moved upwardly inside of the grating assembly to a lifted position.
Figure 7:
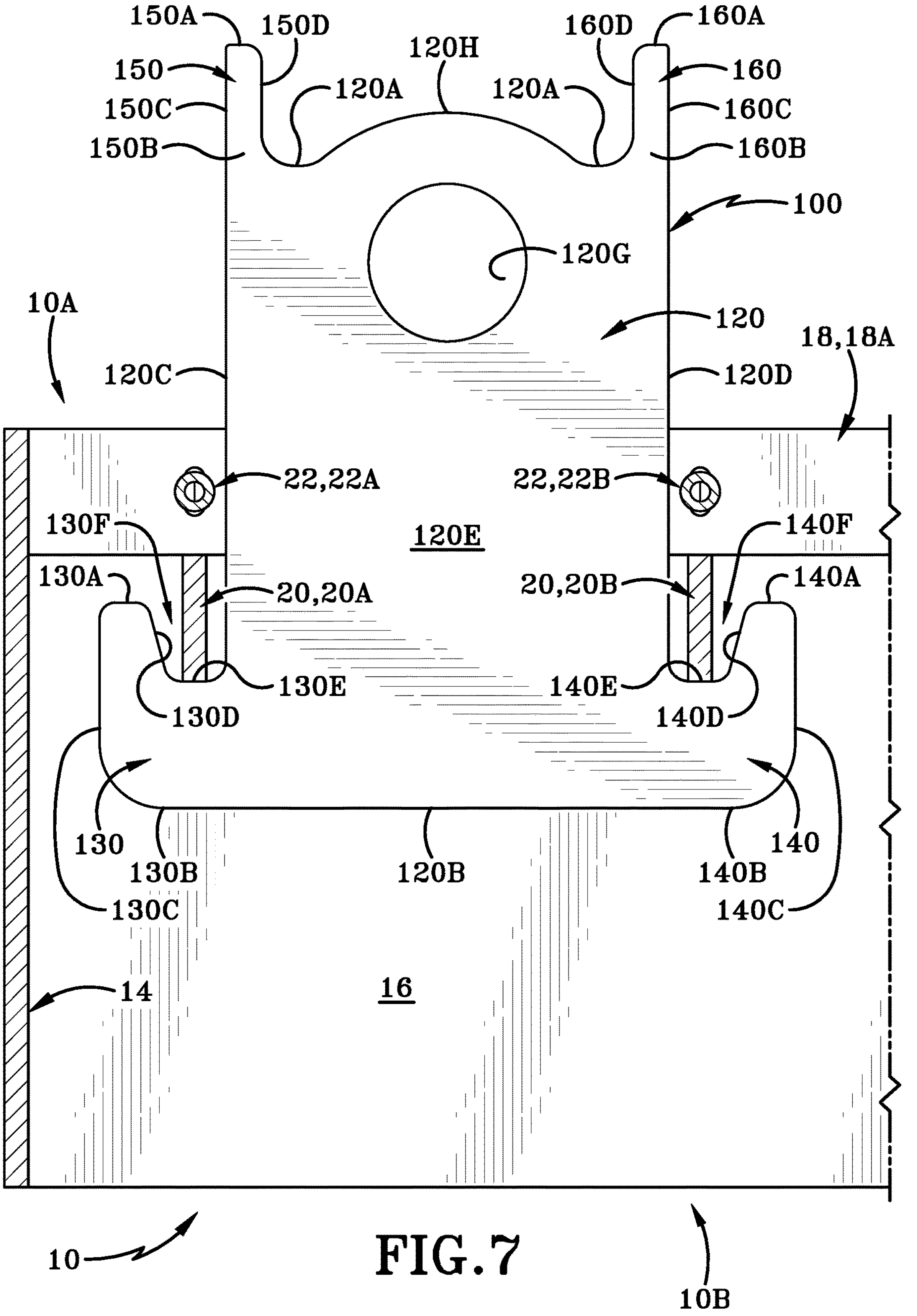
FIG. 7 is a sectional view of the grating assembly and the grate lifter taken in the direction of line 7-7 shown in FIG. 6.

The user may keep inserting the grate lifter 100 into the grating assembly 10 until the first hook member 130 and the second hook member 140 operably engage with the pair of cross members 20. As best seen in FIGS. 6 and 7, the first hook member 130 receives and engages with a first cross member 20A of the pair of cross members 20, and the second hook member 140 receives and engages with a second cross member 20B of the pair of cross members 20 adjacent to the first cross member 20A. With respect to the first hook member 130, at least the third end 130E engages with the first cross member 20A inside of the notch 130F and vertically below the pair of surface bars 18 and the pair of cross members 20. Similarly, with respect to the second hook member 140, at least the third end 140E engages with the second cross member 20B inside of the notch 140F and vertically below the pair of surface bars 18 and the pair of cross members 20. As illustrated in FIGS. 6 and 7, the grate lifter 100 is provided at the lifted position relative to the grating assembly 10.

Figure 9A:
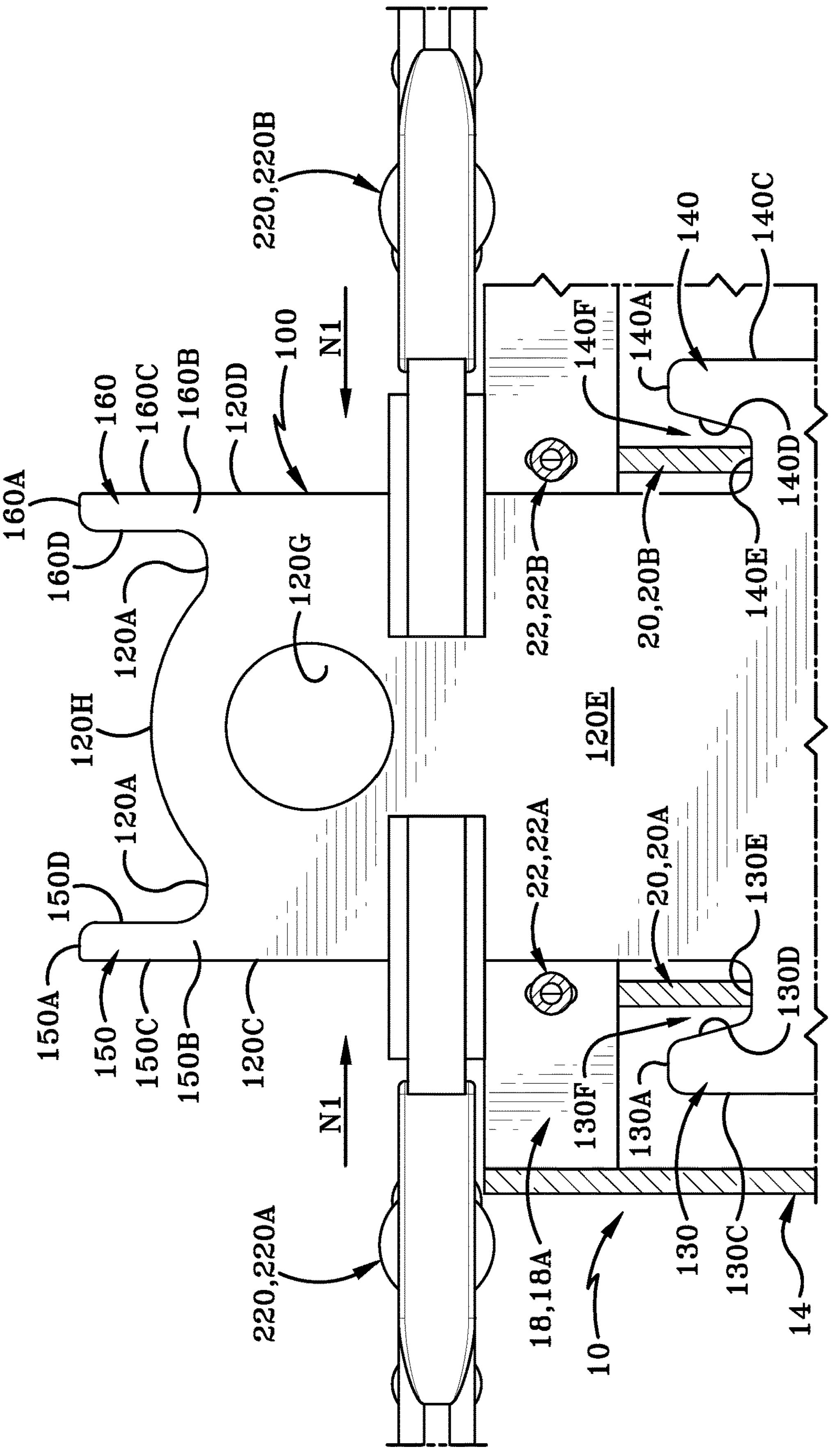
FIG. 9A is an installation view continued from FIG. 6, but a pair of locking tools is operably engaged with the grate lifter to maintain the grate lifter at the lifted position.

Once the first hook member 130 and the second hook member 130 are engaged with the pair of cross members 20, the user may then introduce and engage at least one locking tool 220 with the grate lifter 100 to maintain the grate lifter 100 at the lifted position for installing one or both of the first tab 150 and the second tab 160 with the grating assembly 10. As illustrated in FIG. 9A, the user may introduce and engage a first locking tool 220A with the main body 120 of the grate lifter 100 at the first side 120C between the first end 120A and the second end 120B to maintain the grate lifter 100 at the lifted position; such movement of the first locking tool 220A is denoted by arrow labeled "N1" in FIG. 9A. The user may also introduce and engage a second locking tool 220B with the main body 120 of the grate lifter 100 at the second side 120D between the first end 120A and the second end 120B to maintain the grate lifter 100 at the lifted position; such movement of the second locking tool 220B is also denoted by arrow labeled "N1" in FIG. 9A. Once engaged, the first locking tool 220A and the second locking tool 220B rest on at least one surface bar 18 at the top end 10A of the grating assembly 10 to hold and maintain the grate lifter 100 at the lifted position. It should be understood that the first locking tool 220A and the second locking tool 220B should engage with the main body 120 at positions where the first locking tool 220A and the second locking tool 220B will not interfere with any installation tool 200 when an installation tool 200 is bending one or both of the first tab 150 and the second tab 160.

It should be understood that any suitable locking tools may be used to maintain the grate lifter 100 at the lifted position during installation of the grate lifter 100 with the grating assembly 10. In one aspect, locking pliers or similar tools of the like may be used to maintain the grate lifter 100 at the lifted position during installation of the grate lifter 100 with the grating assembly 10 (see FIGS. 9A-90). In this aspect, locking pliers or similar tools of the like may be used when the grate lifter 100 is being installed with the grating assembly 10 prior to the grating assembly 10 being installed with a supporting structure (e.g., supporting structure 12) or when the grate lifter 100 is being installed with the grating assembly 10 in the field. In another aspect, an installation bracket (not illustrated) configured to match the shape and size of the grate lifter 100 may be used to maintain the grate lifter 100 at the lifted position during installation of the grate lifter 100 with the grating assembly 10. In this aspect, the installation bracket may be used when the grate lifter 100 is being installed with the grating assembly 10 prior to the grating assembly 10 being installed with a supporting structure (e.g., supporting structure 12).

Figure 9B:
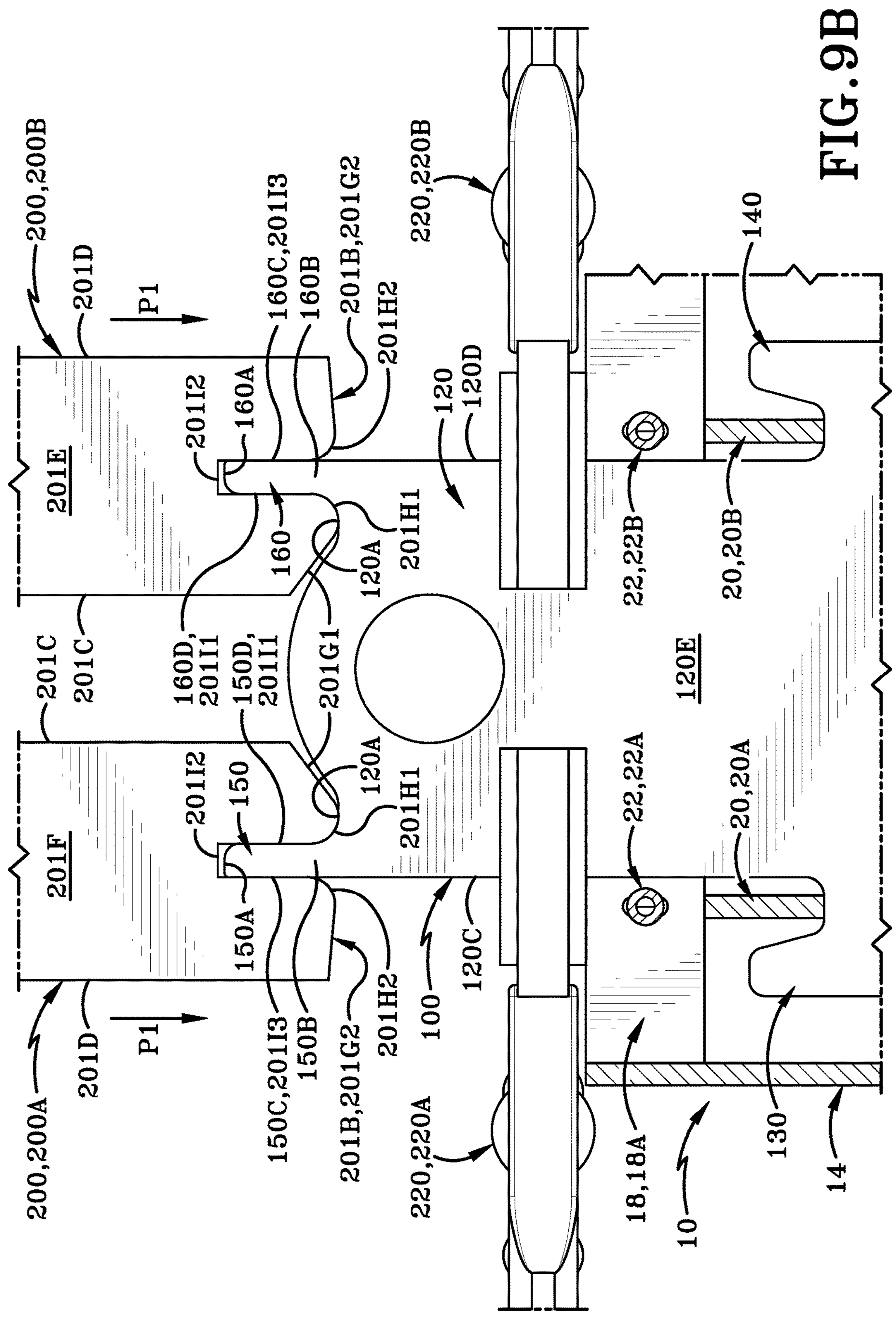
FIG. 9B is another installation view similar to FIG. 9A, but a pair of installation tools are operably engaged with a pair of tabs of the grate lifter.

Once the grate lifter 100 is locked at the lifted position, the user may introduce at least one installation tool 200 to the first tab 150 and the second tab 160. As best seen in FIG. 9B, the user may introduce a first installation tool 200A with the first tab 150 of the grate lifter 100 in that the first tab 150 is received by the first installation tool 200A; it should be understood that first installation tool 200A is identical to installation tool 200 described above. The movement of the first installation tool 200A onto the first tab 150 is denoted by an arrow labeled "P1" as shown in FIG. 9B. The user may continue to move the first installation tool 200A onto the first tab 150 until the first curvilinear wall 201H1 engages with one or both of the second side 150D of the first tab 150 and the first end 120A of the main body 120. Similarly, the user may introduce a second installation tool 200B with the second tab 160 of the grate lifter 100 in that the second tab 160 is received by the second installation tool 200B; it should be understood that second installation tool 200B is also identical to installation tool 200 described above. The movement of the second installation tool 200B onto the second tab 160 is denoted by an arrow labeled "P1" as shown in FIG. 9B. The user may continue to move the second installation tool 200B onto the second tab 160 until the second curvilinear wall 201H2 engages with one or both of the second side 160D of the second tab 160 and the first end 120A of the main body 120.

Figure 9C:
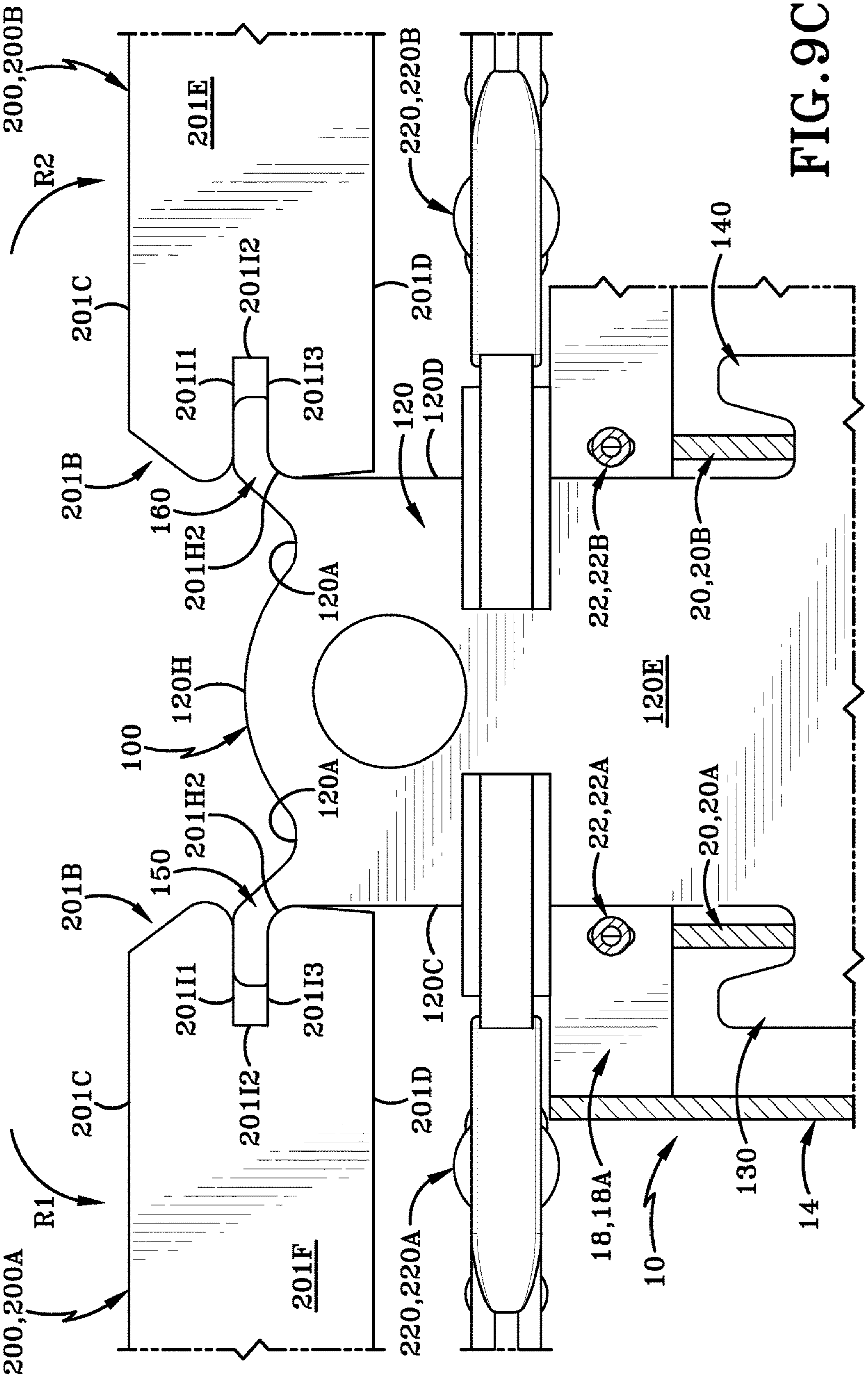
FIG. 9C is another installation view similar to FIG. 9B, but the pair of installation tools are rotated downwardly to bend the pair of tabs from an initial position to a bent position.

Once the first installation tool 200A and the second installation tool 2008 are engaged with the grate lifter 100, the user may then apply a rotational force on each of the first installation tool 200A and the second installation tool 200B, via the handles 201L, to bend the first tab 150 and the second tab 160 from initial positions to bent positions. As best seen in FIG. 9C, the user would rotate the first installation tool 200A in a first rotational direction and rotate the second installation tool 200B in a second rotational direction opposite to the first rotational direction. The first rotational movement of the first installation tool 200A is denoted by an arrow labeled "R1" shown in FIG. 9C, and the second rotational movement of the second installation tool 200B is denoted by an arrow labeled "R2" shown in FIG. 9C. As illustrated, the first installation tool 200A bends the first tab 150 downwardly at the second end 150B while the second installation tool 200B bends the second tab 160 downwardly at the second end 160B. Due to the engagements between the first angled walls 201G1 and the first curvilinear walls 201H1 of the first installation tool 200A and the second installation tool 200B and the first tab 150 and the second tab 160, the first tab 150 and the second tab 160 are bent with ease while the first tab 150 and the second tab 160 are maintained inside of the slots 201J during this operation.

The user may continue to bend the first tab 150 and the second tab 160 with the first installation tool 200A and the second installation tool 200B until the first tab 150 and the second tab 160 are substantially perpendicular to the first side 120C and the second side 120D of the main body 120. In one aspect, the user may continue to bend the first tab 150 and the second tab 160 with the first installation tool 200A and the second installation tool 200B until the first tab 150 and the second tab 160 are bent to approximately ninety degrees measured relative to the initial positions. In another aspect, a user may continue to bend the first tab 150 and the second tab 160 with the first installation tool 200A and the second installation tool 2008 until the first tab 150 and the second tab 160 may engage the pair of lock bars 22 where the grate lifter 100 is freely moveable inside of the grating assembly 10 without interference from at least one surface bar 18, at least one cross member 20, or at least one lock bar 22.

While not illustrated herein, the handles 201L of the first installation tool 200A and the second installation tool 200B would be facing one another in order to bend the first tab 150 and the second tab 160 away from one another. Stated differently, the handles 201L of the first installation tool 200A and the second installation tool 200B would be facing towards the main body 120 when bending the first tab 150 and the second tab 160 away from one another.

It should be understood that while two, separate installation tools 200A, 200B were used to bend the first tab 150 and second tab 160, any suitable number of installation tools may be used to bend one or both of the first tab 150 and the second tab 160. In one example, a single installation tool 200 may be used to bend the first tab 150 in a first operation and then be used to bend the second tab 160 in a second operation subsequent to performing the first operation. Such use of a single installation tool 200 may be used to bend both the first tab 150 and the second tab 160 in separate operations due to specific scenarios, including the availability of only one installation tool and the area of installing a grate lifter.

Figure 9D:
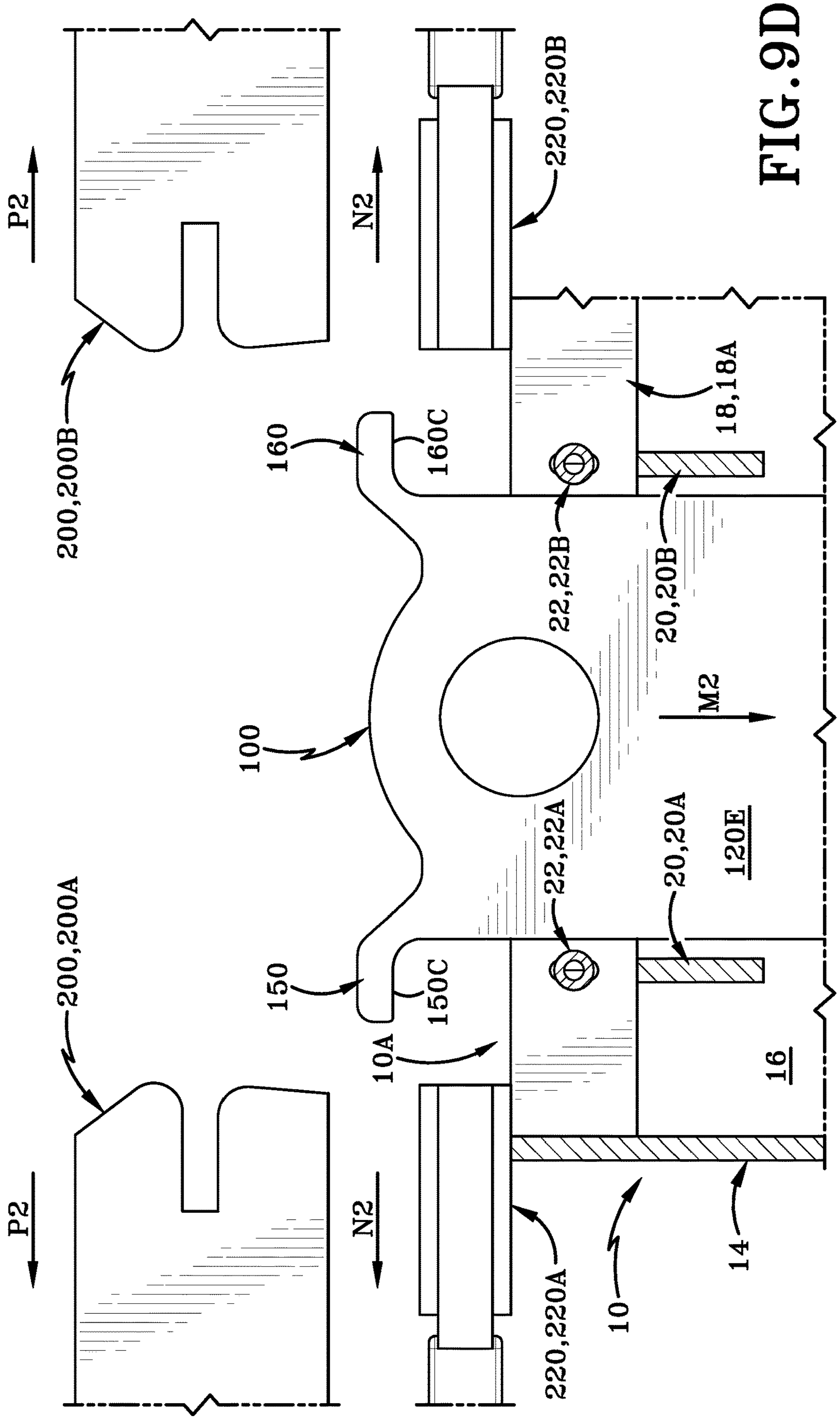
FIG. 9D is another operational view similar to FIG. 9C, but the pair of installation tools and the pair of locking tools are removed from the grate lifter.
Figure 9E:
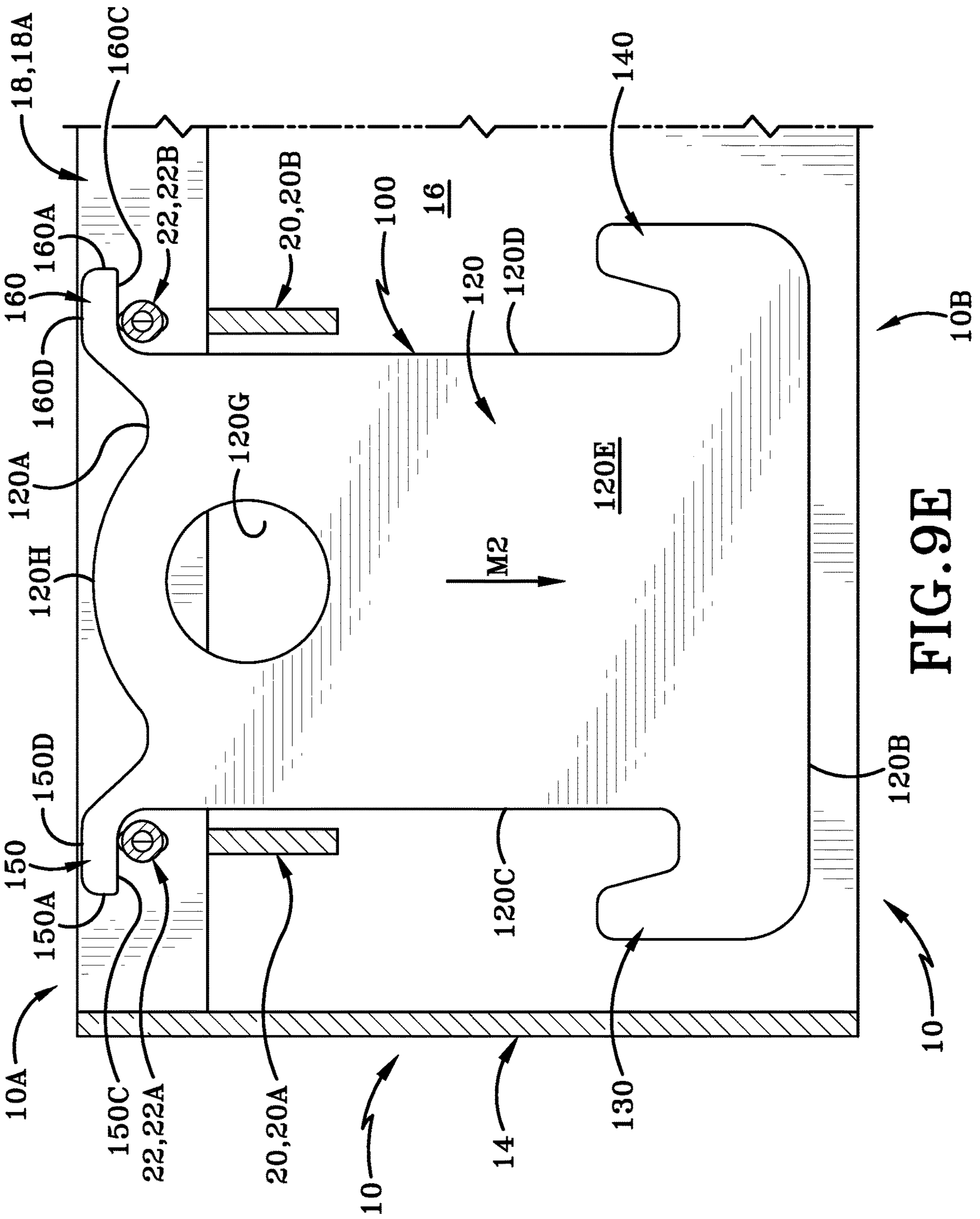
FIG. 9E is another installation view similar to FIG. 9D, but the grate lifter freely moves downwardly from the lifted position to a retracted position inside of the grating assembly.

Once the first tab 150 and second tab 160 are bent from the initial positions to the bent positions, the user may then remove the first installation tool 200A and the second installation tool 200B from the first tab 150 and the second tab 160. Such removal of the first installation tool 200A and the second installation tool 200B from the first tab 150 and the second tab 160 is denoted by arrows labeled "P2" shown in FIG. 9D. The user may then remove the first locking tool 220A and the second locking tool 220B from the main body 120. Such removal of the first locking tool 220A and the second locking tool 220B from the main body 120 is denoted by arrows labeled "N2" shown in FIG. 9D. Once the grate lifter 100 is free from engagement, the grate lifter 100 may be freely lowered down into the grating assembly 10 from the lifted position to the retracted or stowed position; such lowering of the grate lifter 100 from the lifted position to the retracted position is denoted by an arrow labeled "M2" shown in FIGS. 9D and 9E. As illustrated in FIGS. 9D and 9E, the grate lifter 100 is provided in the retracted position when the first tab 150 and the second tab 160 engage with and rest on the pair of lock bar 22 subsequent to being bent from initial positions to bent positions. More particularly, the grate lifter 100 is provided in the retracted position when the first tab 150 engages with and rests on a first lock bar 22A of the pair of lock bar 22 subsequent to being bent from the initial position to the bent position, and the second tab 160 engages with and rests on a second lock bar 22B of the pair of lock bar 22 adjacent to the first lock bar 22A subsequent to being bent from the initial position to the bent position.

It should be understood that the user may reintroduce and reengage the installation tools 200 and the locking tools 220 if the grate lifter 100 is unable to move freely between the lifted position and the retracted position. As such, operations described above and illustrated in FIGS. 9A-9D may be repeated by the user until the grate lifter 100 is able to move freely between the lifted position and the retracted position. In one example, the user may have to repeat the operations for bending a single tab (e.g., first tab 150 or second tab 160). In another example, the user may have to repeat the operations for bending both tabs (e.g., first tab 150 and second tab 160).

It should be understood that one or more grate lifters 100 may be installed with the grating assembly 10 for enabling ease of lifting and lowering the grating assembly 10 from and into the supporting structure 12. As such, the installation methods and techniques described above and illustrated in FIGS. 9A-9D may be repeated one or more times dictated by the number of grate lifters 100 installed with the grating assembly 10. In one aspect, at least one grate lifter 100 may be installed with the grating assembly 10 for enabling ease of lifting and lowering the grating assembly 10 from and into the supporting structure 12. In another aspect, a plurality of grate lifters 100 may be installed with the grating assembly 10 for enabling ease of lifting and lowering the grating assembly 10 from and into the supporting structure 12.

It should be understood that one or more grate lifters 100 may be installed with a new grating assembly 10 or with a preexisting grating assembly 10 currently used in the field. While not illustrated herein, a user may install one or more grate lifters 100 with a preexisting grating assembly 10 when one or more preexisting grate lifters 100 are inoperable for lifting the grating assembly 10 (e.g., one or both of the first hook member 130 and the second hook member 140 fail to engage one or both cross members of the pair of cross members 20). While not illustrated herein, a user may install one or more grate lifters 100 with a preexisting grating assembly 10 when one or more preexisting grate lifters 100 are inoperable for fully retracting into the grating assembly 10 (e.g., one or both of the first tab 150 and the second tab 160 fail to engage one or both lock bars of the pair of lock bars 22).

Having now described the method of installing the grate lifter 100 with the grating assembly 10, a method of moving a portion of the grating assembly 10 from the supporting structure 12 via the grate lifter 100 is described in more detail below.

Prior to moving a portion of the grating assembly 10 from the supporting structure 12, the grate lifter 100 is provided in the retracted position (see FIG. 9E) where the first tab 150 engages with and rests on a first lock bar 22A of the pair of lock bar 22, and the second tab 160 engages with and rests on a second lock bar 22B of the pair of lock bar 22. In this position, the grate lifter 100 is positioned below the top end 10A of the grating assembly 10 to avoid obstructing or hindering pedestrians, vehicles, and/or machines from traversing and/or traveling over the grating assembly 10. More particularly, the first tab 150 and the second tab 160 of the grate lifter 100 are positioned below the top end 10A of the grating assembly 10 to avoid obstructing or hindering pedestrians, vehicles, and/or machines from traversing and/or traveling over the grating assembly 10. As such, the grate lifter 100 remains below the top end 10A and inside of the grating assembly 10 until the grate lifter 100 is lifted from the retracted position to the lifted position.

As best seen in FIG. 10A, a user operably engages a hoist or a winch 240 with the grate lifter 100, via the attachment opening 120G, for vertically moving the grating assembly 10 from the supporting structure 12 via the grate lifter 100. Prior to engage the hoist 240 to the grate lifter 100, a user may need to manually move the grate lifter 100 upwardly from the grating assembly 10 until the attachment opening 120G is above the top end 10A of the grating assembly 10 and outside the grating assembly 10. Once the hoist 240 is engaged with the grate lifter 100, the hoist 240 may then linearly move the grate lifter 100 upwards until the first hook member 130 and the second hook member 140 engage with the pair of cross member 20 to provide the grate lifter 100 in the lifted position; such linearly movement of the grate lifter 100 via the hoist 240 is denoted by an arrow labeled "S1" in FIG. 10A. Once in the lifted position, the hoist 240 may then move a portion of the grating assembly 10, via the grate lifter 100, from the supporting structure 12 until the grating assembly 10 is free from engaging with the supporting structure 12 (see FIG. 10B); such linearly movement of the grate lifter 100 with the grating assembly 10 via the hoist 240 is denoted by an arrow labeled "S2" in FIG. 10B.

It should be understood that one or more grate lifter 100 may be operably engaged with one or more hoists 240 for enabling ease of lifting and lowering the grating assembly 10 from and into the supporting structure 12. As such, the lifting methods and techniques described above and illustrated in FIGS. 10A-10B may be repeated one or more times dictated by the number of grate lifters 100 installed with the grating assembly 10 for lifting and lowering the grating assembly 10 from and into the supporting structure 12. In one aspect, at least one grate lifter 100 may be operably engaged with at least one hoist 240 for enabling ease of lifting and lowering the grating assembly 10 from and into the supporting structure 12. In another aspect, a plurality of grate lifters 100 may be operably engaged with one or more hoists 240 for enabling ease of lifting and lowering the grating assembly 10 from and into the supporting structure 12.

Figure 11:
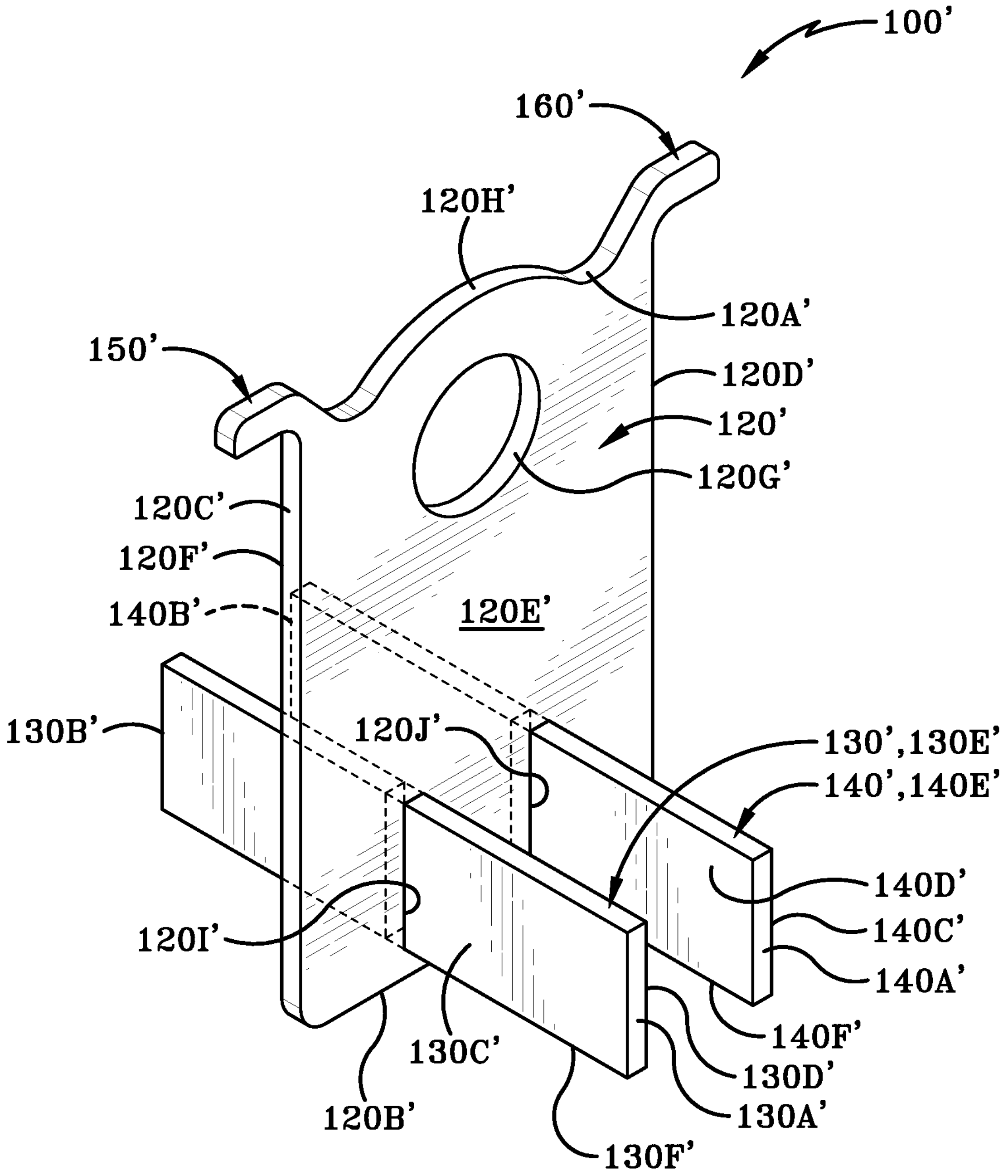
FIG. 11 is a front, top, first side isometric perspective view of another grate lifter according to another aspect of the present disclosure.

As best seen in FIG. 11, an alternative grate lifter according to another aspect of the present disclosure is illustrated and generally indicated as 100'. As described in more detail below, grate lifter 100' is configured to be installed with grating assembly 10' described and illustrated herein, particularly with the grating assembly 10' illustrated in FIGS. 12-13, for moving the grating assembly 10' either from the supporting structure 12 or into the supporting structure 12. Upon installation, grate lifter 100' is freely moveable relative to the grating assembly 10' between a lifted position (see FIGS. 12 and 13) and a retracted position. It should be understood that grate lifter 100' is single, monolithic member that is installed with grating assembly 10' as compared to conventional and/or commercially available grate lifters for moving grating assemblies.

It should be understood that grate lifter 100' is similar to grate lifter 100 described above and illustrated in FIGS. 2 and 4-10B, except as detailed below. The components and features of the grate lifter 100' are described in greater detail below.

Grate lifter 100' may include a main body 120'. As best seen in FIG. 11, the main body 120' may have a first end 120A', a second end 120B' longitudinally opposite to the first end 120A', and a longitudinal axis defined therebetween. The main body 120' may also have a first side 120C' extending between the first end 120A' and the second end 120B', a second side 120D' extending between the first end 120A' and the second end 120B' and transversely opposite to the first side 120C', and a transverse axis defined therebetween. The main body 120' may also include a first surface 120E' that is positioned ahead of the first end 120A', the second end 120B', the first side 120C', and the second side 120D', and a second surface 120F' that is positioned behind of the first end 120A', the second end 120B', the first side 120C', and the second side 120D' and opposite to the first surface 120E'.

Still referring to FIG. 11, the main body 120' may define at least one attachment opening 120G'. As illustrated, the at least one attachment opening 120G' is defined proximate to and/or closest to the first end 120A' of the main body 120'. The at least one attachment opening 120G' also extends entirely through the main body 120' from the first surface 120E' to the second surface 120F' where the first surface 120E' and the second surface 120F' are in fluid communication with one another via the at least one attachment opening 120G'. As described in more detail below, the at least one attachment opening 120G' is configured to enable a hoist (crane or similar tool of the like) to operably engage with the grate lifter 100' for moving the grating assembly 10' relative to the supporting structure 12 via the grate lifter 100' (as best seen in FIGS. 12 and 13). In one aspect, the main body 120' defines a single attachment opening 120G' that is positioned proximate to and/or closest to the first end 120A' of the main body 120' and extends entirely through the main body 120' from the first surface 120E' to the second surface 120F'. In other exemplary embodiments, any suitable number of attachment openings may be defined in a main body of a grate lifter described and illustrated herein for moving a grating assembly relative to a supporting structure via the grate lifter.

Still referring to FIG. 11, the main body 120' may also define a protrusion 120H' that extends radially upwardly from the first end 120A'. In one aspect, the protrusion 120H' may define a curvilinear shape that matches and/or complementary with the curvilinear shape of the at least one attachment opening 120G' defined in the main body 120'. In other exemplary embodiment, the main body 120' may omit and/or remove the protrusion 120H' such that the first end 120A' is free from additional structures and/or features extending from the first end 120A'.

Still referring to FIG. 11, main body 120' may also define at least one aperture that extends entirely through the main body 120. In one aspect, main body 120' may define a first aperture 120I' that extends entirely through the main body 120 in which the first surface 120E' and the second surface 120F' are in fluid communication with one another via the first aperture 120I'. Continuing the same aspect, main body 120' may define a second aperture 120J' that extends entirely through the main body 120 in which the first surface 120E and the second surface 120F' are in fluid communication with one another via the second aperture 120J'. The first aperture 120I' and the second aperture 120J' are also defined adjacent to one another and longitudinally opposite to the attachment opening 120G'. The first aperture 120I' is also formed proximate to the first side 120C', and the second aperture 120J' is also formed proximate to the second side 120D' transversely opposite to the first aperture 120I'. Such use and purpose of the first aperture 120I' and the second aperture 120J' is described in more detail below.

Still referring to FIG. 11, grate lifter 100' also includes at least one hook member that operably engages with the main body 120' at one or both of the first surface 120E' and the second surface 120F' of the main body 120'. In one example, the grate lifter 100' includes a first hook member 130' that operably engages with the main body 120' via the first aperture 120I'. In the same example, the grate lifter 100' includes a second hook member 140' that operably engages with the main body 120' via the second aperture 120J'. As described in more detail below, the first hook member 130' and the second hook member 140' are configured to engage one or more support bars 18' of the grating assembly 10' when the grate lifter 100' is provided in the lifted position and are provided in a mirror-imaged orientation relative to the main body 120'. Inasmuch as the grate lifter 100' includes the first hook member 130' and the second hook member 140', the following description will relate to the first hook member 130'. It should be understood, however, that the description of the first hook member 130' applies substantially equally to the second hook member 140'.

Referring to FIGS. 11 and 12, the first hook member 130' includes a first end 130A' that is remote from the main body 120' while proximate to the first surface 120E', a second end 130B' longitudinally opposite to the first end 130A' and remote from the main body 120' while proximate to the second surface 120F', and a longitudinal axis defined therebetween. The first hook member 130' also includes a first side 1300' extending between the first end 130A' and the second end 130B', a second side 130D' vertically opposite to the first side 130C' and extending between the first end 130A' and the second end 130B', and a transverse axis defined therebetween. The first hook member 130' also includes a top end 130E' positioned above the first end 130A', the second end 130B', the first side 130C', and the second side 130D', and a bottom end 130F' positioned to a second side of the first end 130A', the second end 130B', the first side 130C', and the second side 130D' and transversely opposite to the first surface 130E'. As illustrated, the top end 130E' is perpendicular to the first surface 120E' and the second surface 120F' of the main body 120' along with the bottom end 130F' being perpendicular to the first surface 120E' and the second surface 120F' of the main body 120'.

As described above, the first hook member 130' and the second hook member 140' operably engages with a surface bar of the at least one pair of surface bars 18' in a substantially similar implementation. Additionally, the first hook member 130' and the second hook member 140' are provided in a mirror-image orientation relative to the main body 120. As such, the second hook member 140' include a first end 140A', a second end 140B', a first side 140C', a second side 140D', a top end 140E', and a bottom surface 140F' that are substantially similar to the first end 130A', second end 130B', first side 130C', second side 130D', top end 130E', and bottom end 130F' of the first hook member 130'.

It should be understood that the first hook member 130' and the second hook member 140' may be operably engaged with the main body 120' in any suitable configuration as dictated by the implementation of the grate lifer 100'. In one aspect, the first hook member 130' and the second hook member 140' are formed with the main body 120' in that the main body 120', the first hook member 130', and the second hook member 140' collectively define a single monolithic member. In another aspect, one or both of the first hook member 130' and the second hook member 140' are engaged with the main body 120' in that the main body 120', the first hook member 130', and/or the second hook member 140' are separate components forming the grate lifter 100'.

It should also be understood that the first hook member 130' may be orientated at any suitable angle and/or orientation relative to the main body 120'. In one aspect, the main body 120' is positioned on a first hypothetical plane, and the first hook member 130' is positioned on a second hypothetical plane that is perpendicular with the first hypothetical plane and intersects with the first hypothetical plane. It should also be understood that the second hook member 140' may also be orientated at any suitable angle and/or orientation relative to the main body 120'. In the same aspect, the main body 120' is positioned on the first hypothetical plane, and the second hook member 140' is positioned on a third hypothetical plane that is perpendicular with the first hypothetical plane and intersects with the first hypothetical plane.

It should also be understood that the grate lifter 100' may include one or more hook members that operably engaged with the main body 120' dictated by the implementation of the grate lifter 100', including the number of apertures defined in the main body 100', the size, shape, and configuration of the grater lifter 100', and other suitable reasons. Examples of suitable number of hook members that operably engaged with a main body include at least one, a plurality, three, four, five, and any other suitable number of hook members may be operably engaged with the main body dictated by the implementation of the grate lifter.

Grate lifter 100' also includes at least one tab that operably engages with the main body 120' at the first end 120A' and positioned proximate to one or both of the first side 120C' and the second side 120D' of the main body 120'. In one example, the grate lifter 100' includes a first tab 150' that operably engages with the main body 120' at the first end 120A' and positioned proximate to the first side 120C' of the main body 120'. In the same example, the grate lifter 100' also includes a second tab 160' that operably engages with the main body 120' at the first end 120A' of the main body 120' and positioned proximate to the second side 120D' of the main body 120' transversely opposite to the first tab 150'. It should be understood that the first tab 150' is substantially similar to the first tab 150 described above as well as the second tab 160' being substantially similar to the second tab 160 described above.

Similar to the first tab 150 and the second tab 160 discussed above, first tab 150' and second tab 160' are configured to engage a pair of lock bar 22' of the grating assembly 10' when the first tab 150' and the second tab 160' are bent from initial positions to bent positions (FIG. 11-13) and the grate lifter 100' is provided in the retracted position. Similar to the first tab 150 and the second tab 160 discussed above, the first tab 150' and the second tab 160' are provided in a mirror-imaged orientation relative to the main body 120'.

Having now described the components and parts of the grate lifter 100', a method of installing the grate lifter 100' with a portion of the grating assembly 10' is discussed below.

Initially, a user may introduce the grate lifter 100' into a portion of the grating assembly 10' from a bottom end 10B' of the grating assembly 10'. As best seen in FIG. 12, the user introduces the grate lifter 100' through the bottom end 10B' of the grating assembly 10' while ensuring the grate lifter 100' is centered and/or positioned between a selected pair of surface bars 18'. Once centered, the user may then insert the grate lifter 100' between the selected pair of surface bars 18' and between a first lock bar 22A' and a second lock bar 22B' of a selected pair of lock bars 22' (see FIG. 12).

The user may keep inserting the grate lifter 100' into the grating assembly 10' until the first hook member 130' and the second hook member 140' operably engage with at least one surface bar 18' below the lock bars 22'. As best seen in FIGS. 12 and 13, a portion of first hook member 130' defined between the first end 130A' and the first surface 120E' of the main body 120' directly abuts and engages with a first set of surface bars 18A' of the grating assembly 10'. In one aspect, the first hook member 130' may directly abut and engage with five surface bars 18A' of the grating assembly 10'. A portion of second hook member 140' defined between the first end 140A' and the first surface 120E' of the main body 120' also directly abuts and engages with the first set of surface bars 18A' of the grating assembly 10' adjacent to the first hook member 130'. In one aspect, the second hook member 140' may directly abut and engage with the same five surface bars 18A' of the grating assembly 10' as mentioned previously. Once engaged, a portion of the top end 130E' of the first hook member 130' measured from the first end 130A' to the first surface 120E' engages the first set of surface bars 18A' when the grate lifter 100' is provided in the lifted position (see FIG. 12). Similarly, a portion of the top end 140E' of the second hook member 140' measured from the first end 140A' to the first surface 120E' engages the first set of surface bars 18A' when the grate lifter 100' is provided in the lifted position (see FIG. 12).

Referring to FIG. 12, another portion of the first hook member 130' defined between the second end 130B' and the second surface 120F' of the main body 120' also directly abuts and engages with a second set of surface bars 18B' of the grating assembly 10' that are adjacent with the first set of surface bars 18*k*. In one aspect, the first hook member 130' may directly abut and engage with five different surface bars of the grating assembly 10'. Similarly, another portion of the second hook member 140' defined between the second end 1408' and the second surface 120F' of the main body 120' also directly abuts and engages with the second set of surface bars 18B' of the grating assembly 10' adjacent to the first hook member 130'. In one aspect, the second hook member 130' may directly abut and engage with the same five surface bars of the grating assembly 10' as mentioned previously. Once engaged, another portion of the top end 130E' of the first hook member 130' measured from the second end 130B' to the second surface 120F' engages the second set of surface bars 18B' when the grate lifter 100' is provided in the lifted position (see FIG. 12). Similarly, a portion of the top end 140E' of the second hook member 140' measured from the second end 140B' to the second surface 120F' engages the second set of surface bars 18B' when the grate lifter 100' is provided in the lifted position (see FIG. 12).

While not illustrated herein, the user may introduce and engage the installation tools 200 and the locking tools 220 with the grate lifter 100 to install the grate lifter 100' with the grating assembly 10'. As such, operations described above and illustrated in FIGS. 9A-9D may be repeated by the user for bending the first tab 150' and the second tab 160' of the grate lifter 100' such that the grate lifter 100' is configured to be provided in the retracted position when the first tab 150' and the second tab 160' rest on the pair of lock bars 22'.

It should be understood that one or more grate lifters 100' may be installed with the grating assembly 10' for enabling ease of lifting and lowering the grating assembly 10' from and into the supporting structure 12. As such, the installation methods and techniques described above and illustrated in FIGS. 9A-9D may be repeated one or more times dictated by the number of grate lifters 100' installed with the grating assembly 10'. In one aspect, at least one grate lifter 100' may be installed with the grating assembly 10' for enabling ease of lifting and lowering the grating assembly 10' from and into the supporting structure 12. In another aspect, a plurality of grate lifters 100' may be installed with the grating assembly 10' for enabling ease of lifting and lowering the grating assembly 10' from and into the supporting structure 12.

It should be understood that one or more grate lifters 100' may be installed with a new grating assembly 10' or with a preexisting grating assembly 10' currently used in the field. While not illustrated herein, a user may install one or more grate lifters 100' with a preexisting grating assembly 10' when one or more preexisting grate lifters 100' are inoperable for lifting the grating assembly 10' (e.g., one or both of the hook members 130', 140' fail to engage the first set of surface bars 18A' and/or the second set of surface bars 18B'). While not illustrated herein, a user may install one or more grate lifters 100' with a preexisting grating assembly 10' when one or more preexisting grate lifters 100' are inoperable for fully retracting into the grating assembly 10' (e.g., one or both of the first tab 150' and the second tab 160' fail to engage one or both lock bars of the pair of lock bars 22').

Having now described the method of installing the grate lifter 100' with the grating assembly 10', a method of moving a portion of the grating assembly 10' from the supporting structure 12 via the grate lifter 100' is described in more detail below.

Prior to moving a portion of the grating assembly 10' from the supporting structure 12, the grate lifter 100 is provided in the retracted position where the first tab 150' engages with and rests on a first lock bar 22A' of the pair of lock bar 22', and the second tab 160' engages with and rests on a second lock bar 22B' of the pair of lock bar 22'. In this position, the grate lifter 100' is positioned below the top end 10A' of the grating assembly 10' to avoid obstructing or hindering pedestrians, devices, and/or machines from traversing and/or traveling over the grating assembly 10'. More particularly, the first tab 150' and the second tab 160' of the grate lifter 100' are positioned below the top end 10A' of the grating assembly 10' to avoid obstructing or hindering pedestrians, devices, and/or machines from traversing and/or traveling over the grating assembly 10'. As such, the grate lifter 100' remains below the top end 10A' and inside of the grating assembly 10' until the grate lifter 100' is lifted from the retracted position to the lifted position.

A user may then operably engage a hoist or a winch (similar to hoist 240 discussed above) with the grate lifter 100', via the attachment opening 120G', for vertically moving the grating assembly 10' from the supporting structure 12 via the grate lifter 100'. Prior to engage the hoist to the grate lifter 100', a user may need to manually move the grate lifter 100' upwardly from the grating assembly 10' until the attachment opening 120G' is above the top end 10A' of the grating assembly 10' and outside the grating assembly 10'. Once the hoist is engaged with the grate lifter 100', the hoist may then linearly move the grate lifter 100' upwards until the first hook member 130' and the second hook member 140' engage with the first set of surface bars 18A' and the second pair of surface bars 18B' to provide the grate lifter 100' in the lifted position. Once in the lifted position, the hoist may then move a portion of the grating assembly 10', via the grate lifter 100', from the supporting structure 12 until the grating assembly 10' is free from engaging with the supporting structure 12.

It should be understood that one or more grate lifter 100' may be operably engaged with one or more hoists for enabling ease of lifting and lowering the grating assembly 10' from and into the supporting structure 12. As such, the lifting methods and techniques described above and illustrated in FIGS. 10A-10B and FIGS. 12-13 may be repeated one or more times dictated by the number of grate lifters 100' installed with the grating assembly 10' for lifting and lowering the grating assembly 10' from and into the supporting structure 12. In one aspect, at least one grate lifter 100' may be operably engaged with at least one hoist for enabling ease of lifting and lowering the grating assembly 10' from and into the supporting structure 12. In another aspect, a plurality of grate lifters 100' may be operably engaged with a plurality of hoists for enabling ease of lifting and lowering the grating assembly 10' from and into the supporting structure 12.

Figure 14:
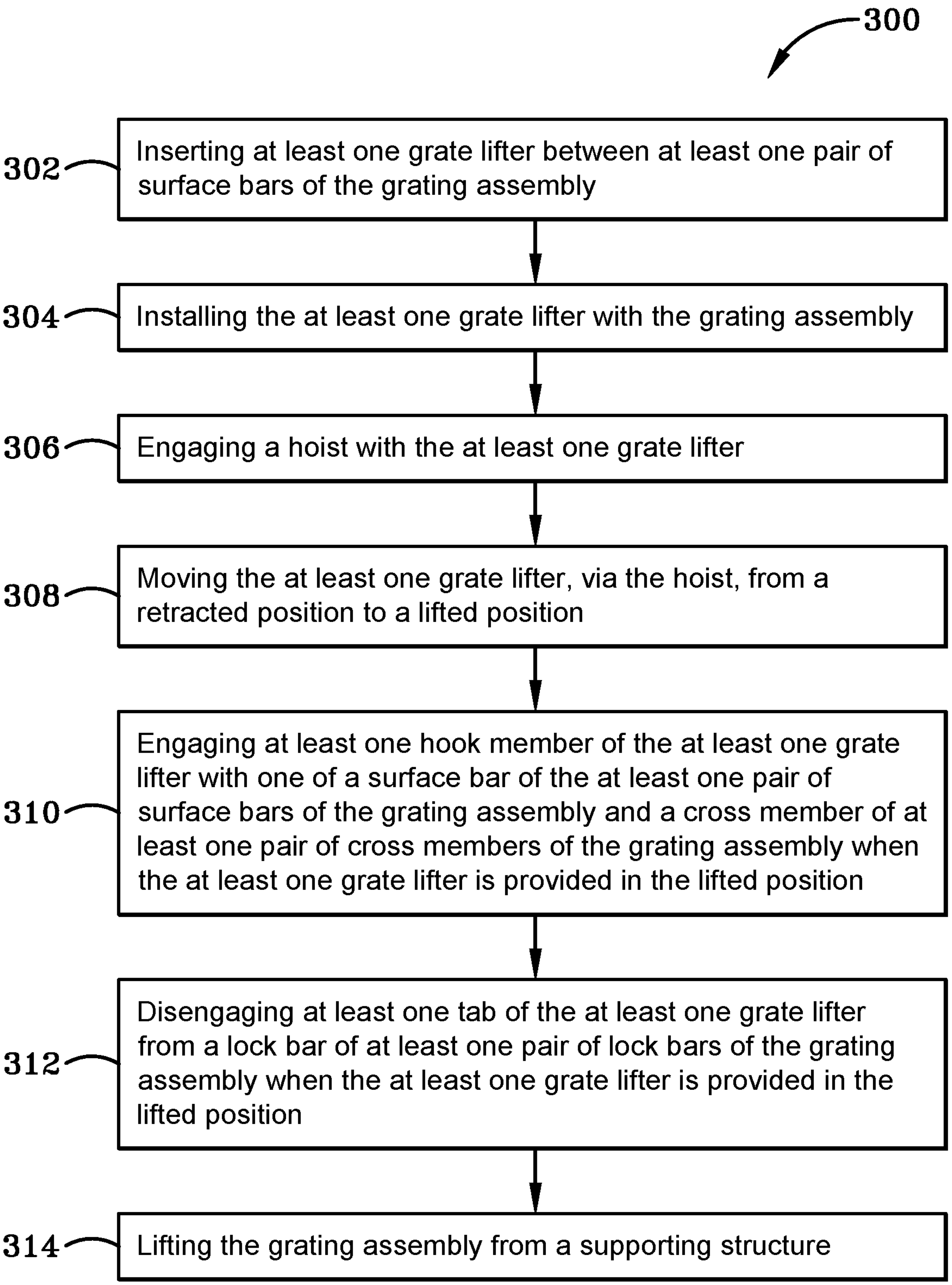
FIG. 14 is a method flowchart of moving a grating assembly from a supporting structure.

FIG. 14 illustrates a method 300. An initial step 302 of method 300 includes inserting at least one grate lifter between at least one pair of surface bars of the grating assembly. Another step 304 of method 300 includes installing the at least one grate lifter with the grating assembly. Another step 306 of method 300 includes engaging a hoist with the at least one grate lifter. Another step 308 of method 300 includes moving the at least one grate lifter, via the hoist, from a retracted position to a lifted position. Another step 310 of method 300 includes engaging at least one hook member of the at least one grate lifter with one of a surface bar of the at least one pair of surface bars of the grating assembly and a cross member of at least one pair of cross members of the grating assembly when the at least one grate lifter is provided in the lifted position. Another step 312 of method 300 includes disengaging at least one tab of the at least one grate lifter from a lock bar of at least one pair of lock bars of the grating assembly when the at least one grate lifter is provided in the lifted position. Another step 314 of method 300 includes lifting the grating assembly from a supporting structure.

In other exemplary embodiments, optional steps or additional steps may be provided in method 300. Optional steps may further include lowering the grating assembly into the supporting structure; disengaging the hoist from the at least one grate lifter; disengaging the at least one hook member of the at least one grate lifter from one of the surface bar of the at least one pair of surface bars of the grating assembly and the cross member of the at least one pair of cross members of the grating assembly when the at least one grate lifter is provided in the retracted position; and engaging the at least one tab of the at least one grate lifter with the lock bar of the at least one pair of lock bars of the grating assembly when the at least one grate lifter is provided in the retracted position. Optional steps may further include that the step of installing the at least one grate lifter with the grating assembly further comprises: engaging at least one locking tool with the at least one grate lifter; maintaining the at least one grate lifter, via the at least one locking tool, at the lifted position; engaging at least one installation tool with the at least one tab; and bending the at least one tab of the at least one grate lifter, via the at least one installation tool, from an initial position to a bent position. Optional steps may further include that the step of bending the at least one tab of the at least one grate lifter, via the at least one installation tool, from an initial position to a bent position further includes that the at least one tab is bent until the at least one tab is bent to about ninety degrees relative to the initial position or rests on the lock bar of the at least one pair of lock bars. Optional steps may further include that the step of installing the at least one grate lifter with the grating assembly further comprises: engaging at least one locking tool with the at least one grate lifter; maintaining the at least one grate lifter, via the at least one locking tool, at the lifted position; engaging a first installation tool with a first tab of the at least one grate lifter; engaging a second installation tool with a second tab of the at least one grate lifter; and bending the first tab and the second tab, via the first installation tool and the second installation tool, from initial positions to bent positions. Optional steps may further include that the step of engaging the at least one hook member of the at least one grate lifter with the grating assembly further comprises: engaging a first hook member with a first cross member of the at least one pair of cross members; and engaging a second hook member with a second cross member of the at least one pair of cross members adjacent to the first cross member. Optional steps may further include that the step of engaging the at least one tab of the at least one grate lifter with the grating assembly further comprises: engaging a first tab with the lock bar of the at least one pair of lock bars; engaging a second tab with a second lock bar of the at least one pair of lock bars adjacent to the lock bar. Optional steps may further include that the step of engaging the at least one hook member of the at least one grate lifter with the grating assembly further comprises: engaging a first hook member with a first surface bar of the at least one pair of surface bars; and engaging a second hook member with a second surface bar of the at least one pair of surface bars adjacent to the first surface bar.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A grate lifter, comprising:

a main body having a first end, a second end longitudinally opposite to the first end, a first surface extending between the first end and the second end, a second surface extending between the first end and the second end and opposite to the first surface, and at least one attachment opening defined at a position between the first end and the second end and extending entirely through the main body between the first surface and the second surface;

at least one hook member operably engaged with the main body at the first end and configured to engage one of at least one surface bar of a grating assembly and at least one cross member of the grating assembly; and at least one tab operably engaged with the main body at the second end and being positioned entirely above the at least one attachment opening and configured to engage at least one lock bar of the grating assembly;

wherein the at least one tab is configured to be adjustable from an initial position to a bent position to engage the at least one lock bar of the grating assembly.

2. The grate lifter of claim 1, wherein the grate lifter is a single monolithic member that is substantially planar between the first end and second end.

3. The grate lifter of claim 1, wherein when the grate lifter is provided in a lifted position, the at least one hook member engages with the at least one cross member of the grating assembly and the at least one tab disengages from the at least one lock bar of the grating assembly.

4. The grate lifter of claim 1, wherein the at least one opening is configured to enable a tool to operably engage with the grate lifter for transitioning the grate lifter between a lifted position and a retracted position to move the grating assembly.

5. The grate lifter of claim 1, wherein the main body further comprises:

a first side extending between the first end and the second end; and a second side extending between the first end and the second end and transversely opposite to the first side; and wherein the at least one hook member further comprises:

a first hook member extending transversely away from the first side, wherein the first hook member is configured to engage with the at least one cross member of the grating assembly; and a second hook member extending transversely away from the second side and transversely opposite to the first hook member, wherein the second hook member is configured to engage at least another cross member of the grating assembly adjacent to the at least one cross member.

6. The grate lifter of claim 5, further comprising:

a first hypothetical plane defined along the first surface and the second surface; and a second hypothetical plane defined along the first hook member; and a third hypothetical plane defined along the second hook member;

wherein the first hypothetical plane, the second hypothetical plane, and third hypothetical plane are parallel with one another.

7. The grate lifter of claim 5, wherein the at least one tab further comprises:

a first tab extending longitudinally away from the first end, wherein the first tab is configured to engage a first lock bar when adjusted from the initial position to the bent position; and a second tab extending longitudinally away from the first end and transversely opposite to the first tab, wherein the second tab is configured to engage a second lock bar adjacent to the first lock bar when adjusted from the initial position to the bent position.

8. The grate lifter of claim 1, wherein the main body further comprises:

a first aperture defined in the main body; and a second aperture defined in the main body;

wherein the at least one hook member further comprises:

a first hook member engaged with the main body inside of the first aperture, wherein the first hook member is configured to engage with the at least one surface bar of the grating assembly; and a second hook member engaged with the main body inside of the second aperture, wherein the second hook member is configured to engage at least another surface bar of the grating assembly adjacent to the at least one surface bar.

9. The grate lifter of claim 8, further comprising:

a first hypothetical plane defined along main body;

a second hypothetical plane defined along the first hook member; and a third hypothetical plane defined along the second hook member;

wherein the first hypothetical plane is perpendicular with and intersects the second hypothetical plane and the third hypothetical plane.

10. The grate lifter of claim 8, wherein the at least one tab further comprises:

a first tab extending longitudinally away from the first end, wherein the first tab is configured to engage the at least one lock bar when adjusted from the initial position to the bent position; and a second tab extending longitudinally away from the first end and transversely opposite to the first tab, wherein the second tab is configured to engage at least another lock bar of the grating assembly adjacent to the at least one lock bar when adjusted from the initial position to the bent position.

11. The grate lifter of claim 1, further comprising:

a protrusion extending outwardly from the second end of the main body and defining a shape complementary to the at least one attachment opening.

12. The grate lifter of claim 1, wherein the first end of the main body is substantially flat; and wherein the second end of the main body is curvilinear.

* * * * *